United States Patent
Mather et al.

(10) Patent No.: US 7,185,919 B2
(45) Date of Patent: Mar. 6, 2007

(54) METHOD AND APPARATUS FOR USE ON A SAFETY BELT SYSTEM FOR RESTRAINING THE MOVEMENT OF AN OCCUPANT OR CHILD SEAT

(75) Inventors: Bruce A. Mather, Hockessin, DE (US); Paul Casimer Arone, Royal Oak, MI (US); Wesley J. Blanchard, Troy, MI (US); Kenneth Gordon Grant, Jr., Northville, MI (US); Philip Garret Kosarek, Shelby Township, MI (US); Richard Lonetto, Thornhill (CA); Tom Manley, Brampton (CA); Richard McCulloch, Oakville (CA); Timothy Smith, Commerce, MI (US); Steven Thompson, Dearborn, MI (US); Michael T. Vecchio, Livonia, MI (US); John H. Young, Grosse Ile, MI (US)

(73) Assignee: Lap Belt Cinch, Inc., Hockessin, DE (US)

( * ) Notice: Subject to any disclaimer, the term of this patent is extended or adjusted under 35 U.S.C. 154(b) by 0 days.

(21) Appl. No.: 10/754,076

(22) Filed: Jan. 7, 2004

(65) Prior Publication Data
US 2004/0195819 A1 Oct. 7, 2004

Related U.S. Application Data

(60) Provisional application No. 60/438,615, filed on Jan. 8, 2003, provisional application No. 60/462,967, filed on Apr. 15, 2003, provisional application No. 60/499,510, filed on Sep. 2, 2003.

(51) Int. Cl.
*B60R 22/00* (2006.01)
*A47C 15/00* (2006.01)

(52) U.S. Cl. .............. 280/808; 280/801.1; 280/806; 24/170; 24/633; 24/635

(58) Field of Classification Search ............ 280/808, 280/801.1, 806; 24/170, 633, 635; 297/468, 297/476, 478–480
See application file for complete search history.

(56) References Cited

U.S. PATENT DOCUMENTS

| | | | | |
|---|---|---|---|---|
| 3,276,085 A | * | 10/1966 | Spranger | 24/171 |
| 3,344,486 A | * | 10/1967 | Eveland | 24/194 |
| 3,888,541 A | * | 6/1975 | Stephenson | 297/479 |
| 4,306,735 A | * | 12/1981 | Pfeiffer et al. | 280/807 |
| 4,310,175 A | * | 1/1982 | Pickett | 280/801.1 |
| 4,371,192 A | | 2/1983 | Alix | 280/801 |
| 4,452,469 A | * | 6/1984 | Rogers, Jr. | 280/801.1 |
| 4,486,031 A | | 12/1984 | Holler et al. | 280/802 |
| 4,726,625 A | * | 2/1988 | Bougher | 297/483 |
| 5,000,481 A | | 3/1991 | Willson | 280/808 |
| 5,100,176 A | * | 3/1992 | Ball et al. | 280/801.1 |
| 5,222,278 A | | 6/1993 | Ball et al. | 24/198 |
| 5,311,653 A | * | 5/1994 | Merrick | 24/196 |

(Continued)

FOREIGN PATENT DOCUMENTS

| EP | 0 800 970 A | 10/1997 |
|---|---|---|
| EP | 04 70 0847 | 4/2006 |

*Primary Examiner*—Ruth Ilan
(74) *Attorney, Agent, or Firm*—Patterson & Sheridan LLP

(57) ABSTRACT

In one embodiment, an apparatus for reversibly locking a lap belt portion of a safety belt webbing in a three-point, continuous loop seat belt system which includes a tongue assembly having the belt webbing routed therethrough, includes a cinch body adapted to mount to the tongue assembly, and a cam coupled to the cinch body and adapted to urge the belt webbing against the cinch body.

20 Claims, 27 Drawing Sheets

U.S. PATENT DOCUMENTS

| | | | |
|---|---|---|---|
| 5,350,196 A | 9/1994 | Atkins | 280/808 |
| 5,548,874 A | 8/1996 | Mishina et al. | 24/170 |
| 5,788,281 A * | 8/1998 | Yanagi et al. | 280/806 |
| 5,788,282 A | 8/1998 | Lewis | 280/808 |
| 5,806,148 A | 9/1998 | McFalls et al. | |
| 5,870,816 A | 2/1999 | McFalls et al. | 29/434 |
| 5,979,982 A * | 11/1999 | Nakagawa | 297/250.1 |
| 5,983,463 A * | 11/1999 | Prentkowski et al. | 24/196 |
| 6,139,059 A | 10/2000 | Metzger | 280/808 |
| 6,213,508 B1 | 4/2001 | Cornell | 280/801.1 |
| 6,390,562 B1 * | 5/2002 | Takamizu et al. | 297/483 |
| 6,708,380 B2 * | 3/2004 | Schneider et al. | 24/633 |
| 6,832,781 B2 * | 12/2004 | Rastegar et al. | 280/806 |

* cited by examiner

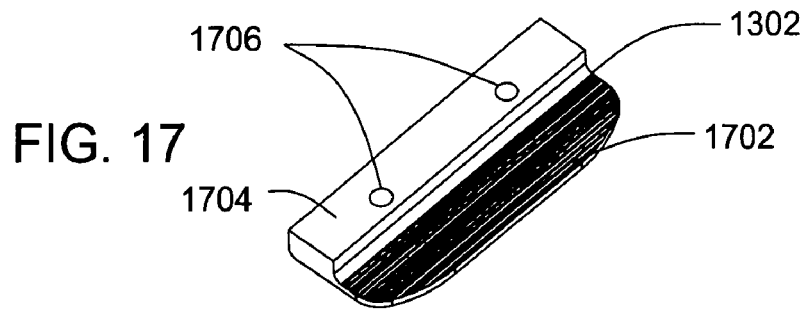
FIG. 17
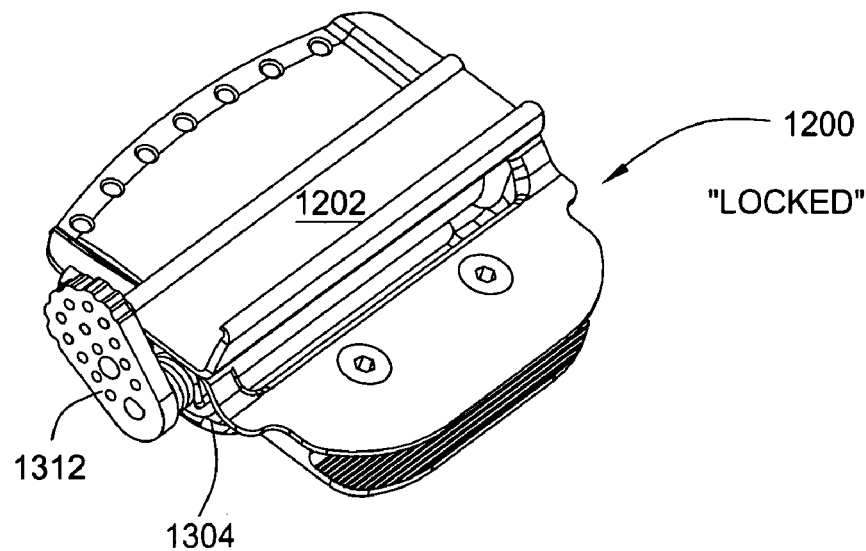
FIG. 19A "LOCKED"
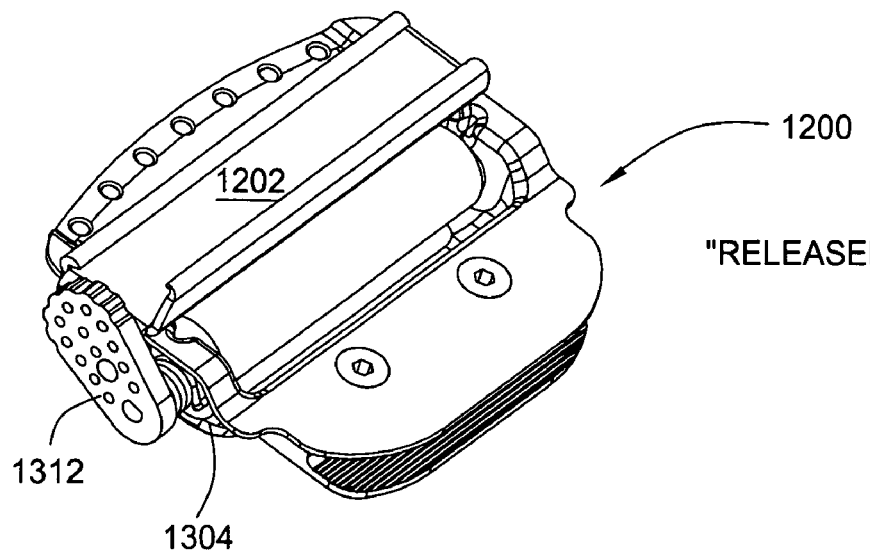
FIG. 19B "RELEASED"

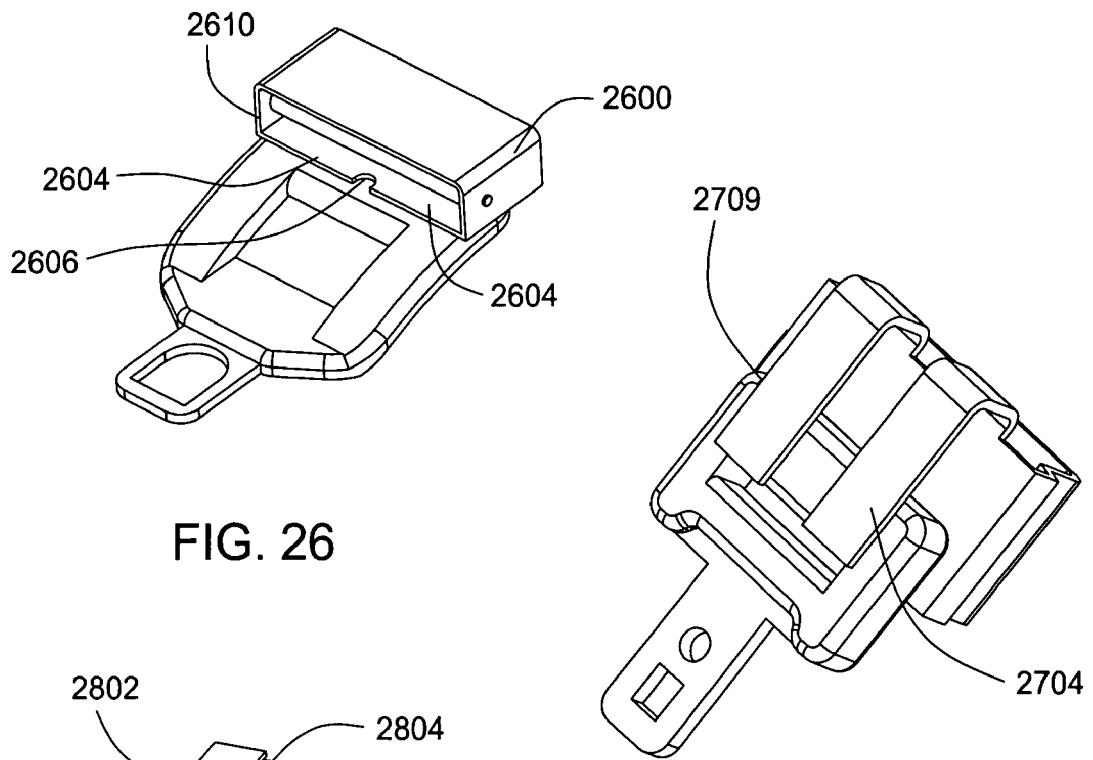
FIG. 26
FIG. 27
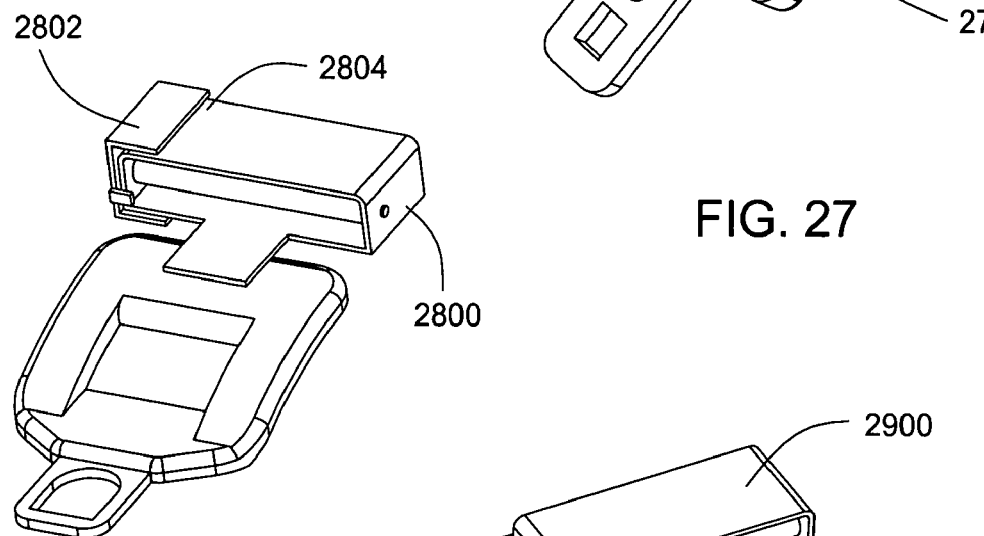
FIG. 28
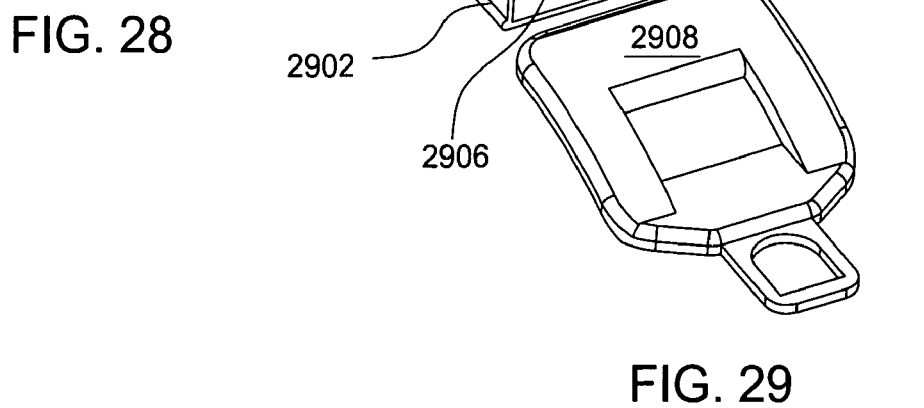
FIG. 29

METHOD AND APPARATUS FOR USE ON A SAFETY BELT SYSTEM FOR RESTRAINING THE MOVEMENT OF AN OCCUPANT OR CHILD SEAT

CROSS REFERENCE TO RELATED APPLICATIONS

The present invention claims the benefit of U.S. Provisional Patent Applications Nos. 60/438,615, filed Jan. 8, 2003 (titled "Passive Vehicle Occupant Safety System Incorporating A Lap Belt Cinch Device"); 60/462,967, filed Apr. 15, 2003 (titled "Passive Vehicle Occupant Safety System Incorporating A Lap Belt Cinch Device With Enable/Disable Feature"); and 60/499,510, filed Sep. 2, 2003 (titled "Apparatus For Use On A Safety Belt System For Restraining The Movement Of An Occupant Or Child Seat"), each of which is herein incorporated by reference in its entirety.

FIELD OF THE INVENTION

This invention relates generally to the field of passenger restraint systems.

BACKGROUND OF THE INVENTION

A typical and known vehicle seat belt system is a three-point continuous loop seat belt system. A three-point continuous loop seat belt system includes a seat belt retractor and a length of belt webbing. The belt webbing extends from the retractor through a D-ring fixed to the vehicle and then down to an anchor point near the vehicle floor. A tongue assembly is slidable (freely moveable) along the length of belt webbing between the D-ring and the anchor point. To use the seat belt system, a vehicle occupant grasps the tongue assembly, pulling the belt across his/her body, and inserts a portion of the tongue assembly into a buckle. When the tongue assembly is fastened in the buckle, a first portion of the belt webbing extends across the lap of the vehicle occupant and a second portion of the belt webbing extends diagonally across the torso of the vehicle occupant. When the tongue assembly is released from the buckle, the belt webbing is rewound by the retractor.

The tongue assembly needs to slide freely along the belt when the occupant moves the tongue assembly toward the buckle to provide simple and convenient belt length adjustment because not all drivers or passengers are the same size, and to compensate for clothing thicknesses such as the use of jackets in the winter. The tongue assembly should also slide along the belt after the occupant unlocks the tongue assembly from the buckle so that the retractor can fully wind up the belt. The retractor would otherwise carry the tongue assembly upwardly to the D-ring, whereupon further movement of the belt would be prevented as the D-ring would block further movement of the tongue assembly. Free movement of the belt webbing through the tongue is also critical since locking or tightening of the shoulder belt portion must lock or tighten the lap belt portion.

In most modern vehicle seat belt systems, the seat belt retractor remains "unlocked" or "loose" at all times unless the seat belt system detects an impending impact. This permits slack in both the shoulder belt and lap belt portions. The objectives of allowing the slack are: (1) to permit driver or passenger comfort and (2) to allow the driver or passenger the ability to reach forward (e.g., to adjust a radio) without having to loosen or unbuckle the seat belt. However, in the event of an accident, the seat belt retractor locks, thus preventing further forward motion of the occupant during deceleration. In many modern systems, a "pre-tensioner" mechanism proactively tightens the seat belt by retracting the shoulder belt under great force for increased occupant restraint. The pre-tensioning retraction of the shoulder belt also tightens the lap belt portion because the continuous belt web slides freely through the tongue. This is an important safety feature intended to provide lower body restraint.

The above-described genres of typical seat belts have numerous failings in several common areas of seat belt use: during high performance and off-road driving, loose lap belts allow the driver and passengers to slide in their seats, thus causing loss of optimum vehicle control; loose lap belts allow "slumping" or "slouching" which can become tiring and induce fatigue during multi-hour trips; and when a child seat is used, loose lap belts permit unsafe seat movement and potentially dangerous stability situations. In all common events, the slack of the typical seat belt design fails to provide a desired degree of controllable restraint in non-accident situations because the lap belt portion is loose.

SUMMARY OF THE INVENTION

In one embodiment, the invention is an apparatus for use in a safety belt system for restraining the movement of an occupant or a child seat. In one embodiment of the present invention, an apparatus for reversibly locking a lap belt portion of a belt webbing in a three-point, continuous loop seat belt system which includes a tongue assembly having the belt webbing routed therethrough, includes a cinch body adapted to mount to the tongue assembly, and a cam coupled to the cinch body and adapted to urge the belt webbing against the cinch body thereby providing a reversible locking of the lap belt portion.

In another embodiment of the present invention, an apparatus for reversibly locking a lap belt portion of a belt webbing in a three-point, continuous loop seat belt system which includes a tongue assembly having the belt webbing routed therethrough, includes a cinch body, a cam carrier assembly and a release arm permitting adjustment without disengaging the seat belt tongue from the buckle.

The cinch body has an upper frame and a lower frame, wherein the upper frame comprises axially spaced, oppositely disposed first and second arms separated by a base. The first arm has a first notch extending axially away from the second arm, and the second arm has a second notch extending axially away from the first arm, wherein the first notch and the second notch are used to mount and align a cam carrier assembly to the cinch body. The lower frame comprises axially spaced, oppositely disposed first and second arms, the first arm being attached to the upper frame of the cinch body, and the first arm and the second arm used to attach the tongue assembly to the cinch body.

The cam carrier assembly, including a cam, is mounted to the cinch body such that the first length of belt webbing routed through the tongue assembly is locked between the base of the cinch body and the cam.

A release arm, coupled to the cam, is used for rotating the cam such that the first length of belt webbing routed through the tongue assembly can thereby be manually released from the base of the cinch body allowing movement of the cinch body, the mounted cam carrier assembly, and the tongue assembly along the belt of the safety belt system.

BRIEF DESCRIPTION OF THE DRAWINGS

The teachings of the present invention can be readily understood by considering the following detailed description in conjunction with the accompanying drawings, in which:

FIG. 17 depicts one embodiment of a clamp plate for use with the belt cinch illustrated in FIG. 12;

FIG. 19A depicts the belt cinch of FIG. 12 in a "release" position";

FIG. 19B depicts the belt cinch of FIG. 12 in a "lock" position;

FIG. 26 depicts one embodiment of a cam and cam housing for use in a belt cinch, according to one embodiment of the present invention;

FIG. 27 depicts another embodiment of a cam and cam housing for use in a belt cinch, according the present invention;

FIG. 28 depicts another embodiment of a cam and cam housing for use in a belt cinch, according present invention;

FIG. 29 depicts another embodiment of a cam and cam housing for use in a belt cinch, according the present invention;

To facilitate understanding, identical reference numerals have been used, where possible, to designate identical elements that are common to the figures.

DETAILED DESCRIPTION OF THE INVENTION

The present invention will be described within the context of a factory-installed, three-point, continuous loop seat belt system and associated devices that help restrain the movement of an occupant of an automobile or of a child seat in an automobile. However, it will be appreciated by those skilled in the art that the subject invention may be advantageously employed to provide a means for securing occupants in other belt systems of various types and in vehicles (including trucks, aircraft, heavy construction equipment, and military ground vehicles) of various types. It will also be appreciated by those skilled in the art that the subject invention may be designed to be retrofit (added after manufacture of the seat belt) or built into a seat belt or child safety car seat at the time of manufacture. Thus, the invention has broad applicability beyond the specific automobile seat belt system described herein.

Figure 1A:
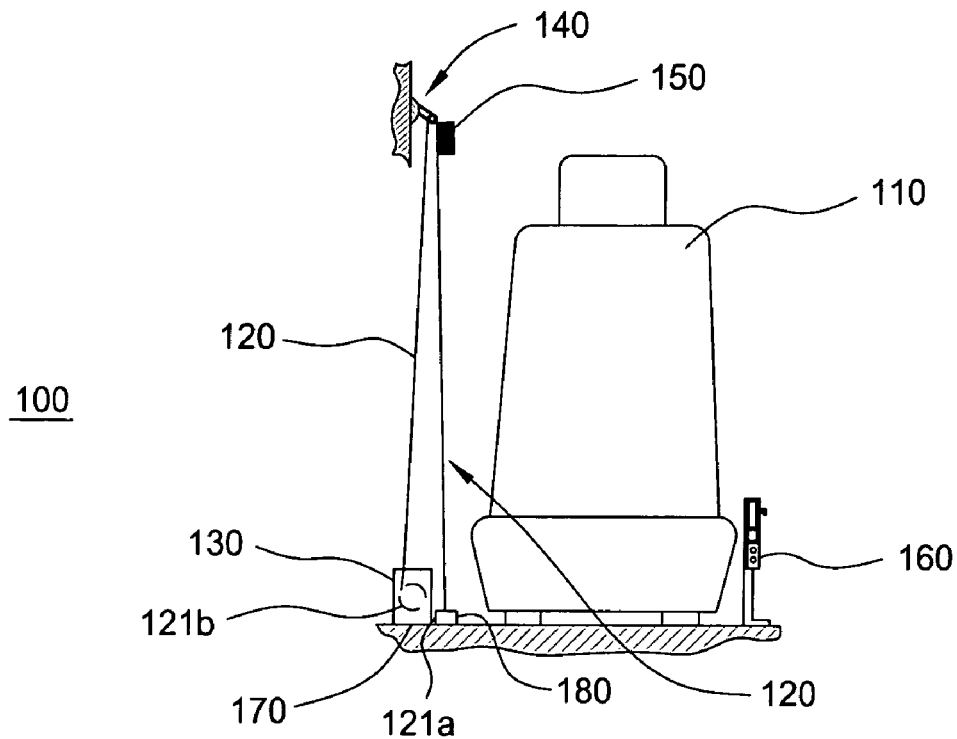
FIG. 1A depicts an embodiment of a typical, factory-installed, three-point, continuous loop seat belt system as found in most modern automobiles, in the retracted position.

FIG. 1A depicts an embodiment of a typical, factory-installed, three-point, continuous loop seat belt system 100 as found in most modern automobiles, in the retracted position. The seat belt system 100 of FIG. 1A includes, an automobile seat 110, a length of seat belt webbing 120, a seat belt retractor 130, a D-ring 140, a tongue assembly 150, and a buckle 160. During the operation of an automobile, the occupant of the automobile sits on the automobile seat 110, illustratively a front passenger seat, and is typically restrained in the seat 110 by a seat belt system as the system 100 depicted in the FIG. 1A. A first end 121a of the length of seat belt webbing 120 is anchored to the automobile body 170 at an anchor point 180 located to one side of the automobile seat 110. A second end 121b of the belt webbing 120 is attached to the seat belt retractor 130, which is secured to the automobile body 170 on the same side of the automobile seat 110 as the anchor point 180 so that the anchor point 180 is positioned between the seal belt retractor 130 and the automobile seal 110. Intermediate to its ends 121a and 121b, the seat belt webbing 120 passes through the tongue assembly 150 (as exemplified in FIG. 2) and through the D-ring 140, which is located above the seat belt retractor 130 and the anchor point 180. When the seat belt system 100 is not in use (i.e., in its stowed condition) the excess belt webbing 120 is typically rewound by the seat belt retractor 130 and is orientated generally vertically on the one side of the automobile seat 110, as depicted in FIG. 1A.

Figure 1B:
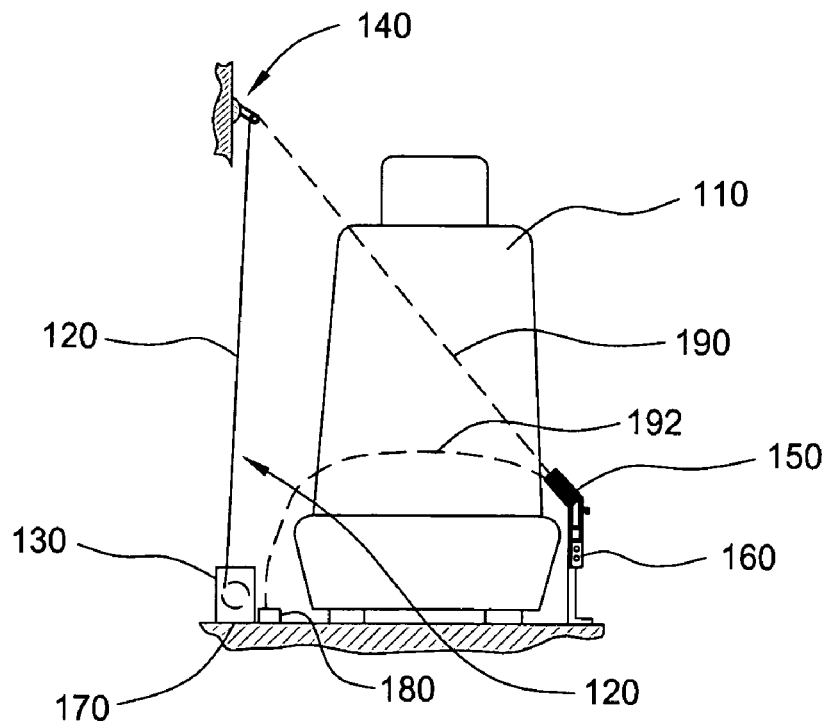
FIG. 1B depicts the seat belt system of FIG. 1A in the engaged position.

FIG. 1B depicts the seat belt system 100 of FIG. 1A in the engaged position. To engage the seat belt system 100, the tongue assembly 150 is manually grasped and is pulled across the lap and torso of the occupant sitting in the automobile seat 110. As the tongue assembly 150 is pulled across the lap and torso of the occupant, the tongue assembly 150 slides freely along the length of the belt webbing 120, and the belt webbing 120 is unwound under (e.g., against) mild tension from the seat belt retractor 130. When the belt webbing 120 has been pulled across the lap and torso of the occupant, the tongue assembly 150 is engaged with the buckle 160. The buckle 160 is anchored to the automobile body 170 and is disposed to a side of the automobile seat 110 opposite the anchor point 180. When the seat belt system 100 is buckled or engaged, the length of the belt webbing 120 is divided by the tongue assembly 150 into a shoulder (torso) portion 190, which extends between the D-ring 140 and the engaged tongue assembly 150, and a lap portion 192, which extends between the engaged tongue assembly 150 and the anchor point 180.

It should be noted that any application of tension (such as slowly leaning forward against the seat belt) easily counteracts the mild tension of the seat belt retractor 130 and permits the shoulder portion 190 and/or lap portion 192 to increase in length and thus loosen. Only if the seat belt retractor 130 locks (as it is designed to do under emergency situations) will the seat belt should and lap portions 190 and 192 become of fixed length and thereby restraining.

Figure 2:
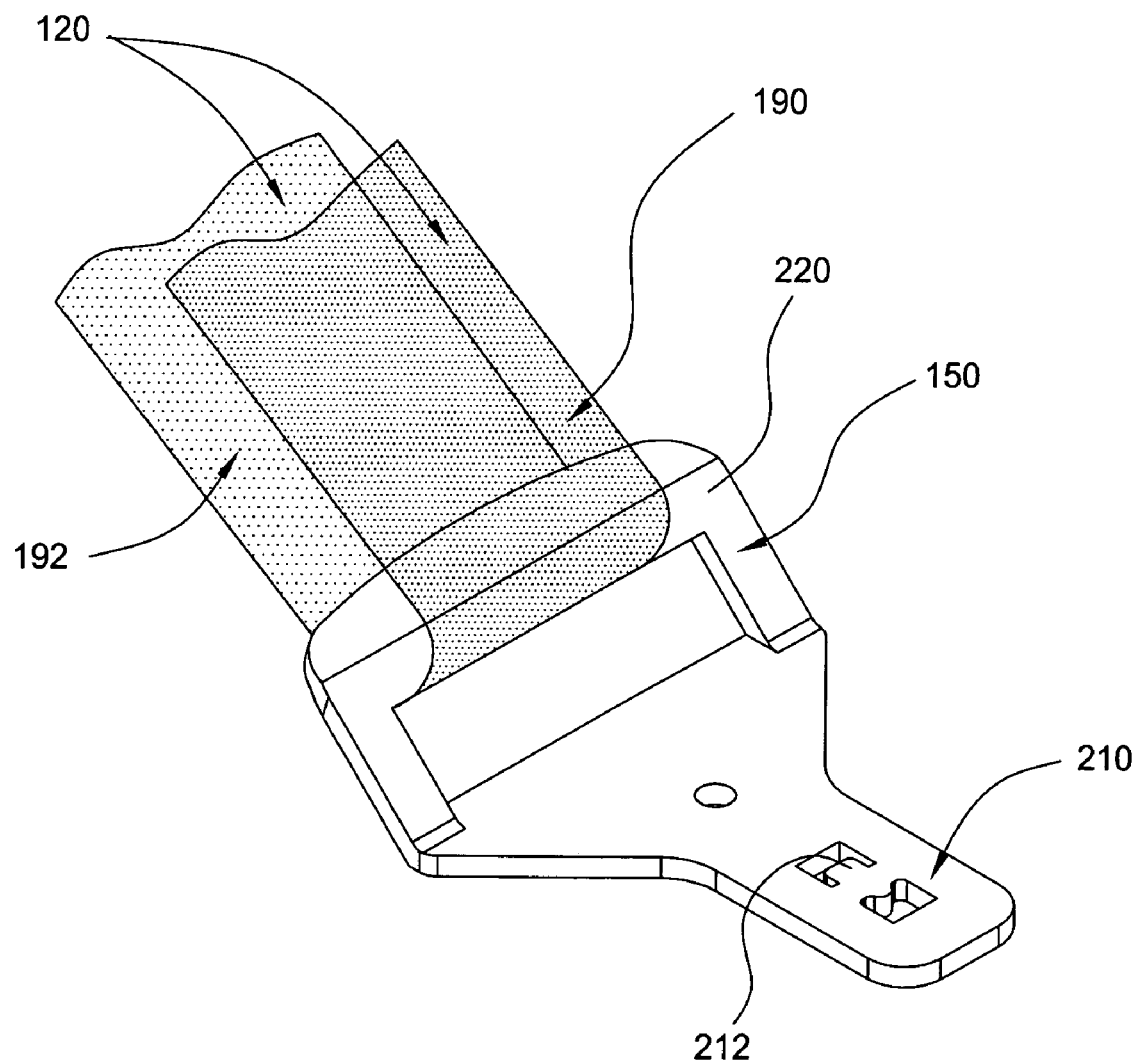
FIG. 2 depicts an embodiment of a tongue assembly, suitable for use in the seat belt system of FIG. 1A and FIG. 1B.

FIG. 2 depicts one embodiment of the tongue assembly 150, suitable for use in the seat belt system 100 illustrated in FIG. 1A and FIG. 1B. The tongue assembly 150 comprises a tapered tongue lock plate 210 having at least one locking mechanism 212 formed therein, and a bracket 220 coupled to the lock plate 210. The seat belt webbing 120 passes through the bracket 220 of tongue assembly 150, which separates the continuous webbing 120 into the shoulder portion 190 and the lap belt portion 192. The exact point of separation is variable since the tongue assembly 150 slides freely along the length of the seat belt webbing 120 to facilitate the buckling and stowage of the seat belt system 100.

To engage the seat belt system 100, the tongue assembly 150 is grasped by the occupant, pulled across the occupant's body, unwinding additional seat belt webbing 120 from the seat belt retractor 130 as needed, and subsequently inserted into the buckle 160. The tongue assembly 150 is inserted into the buckle 160 via the tongue lock plate 210, and the at least one locking mechanism 212 engages the buckle 160 to secure the third point of the 3-point seat belt system 100 of FIG. 1A and FIG. 1B.

Figure 3:
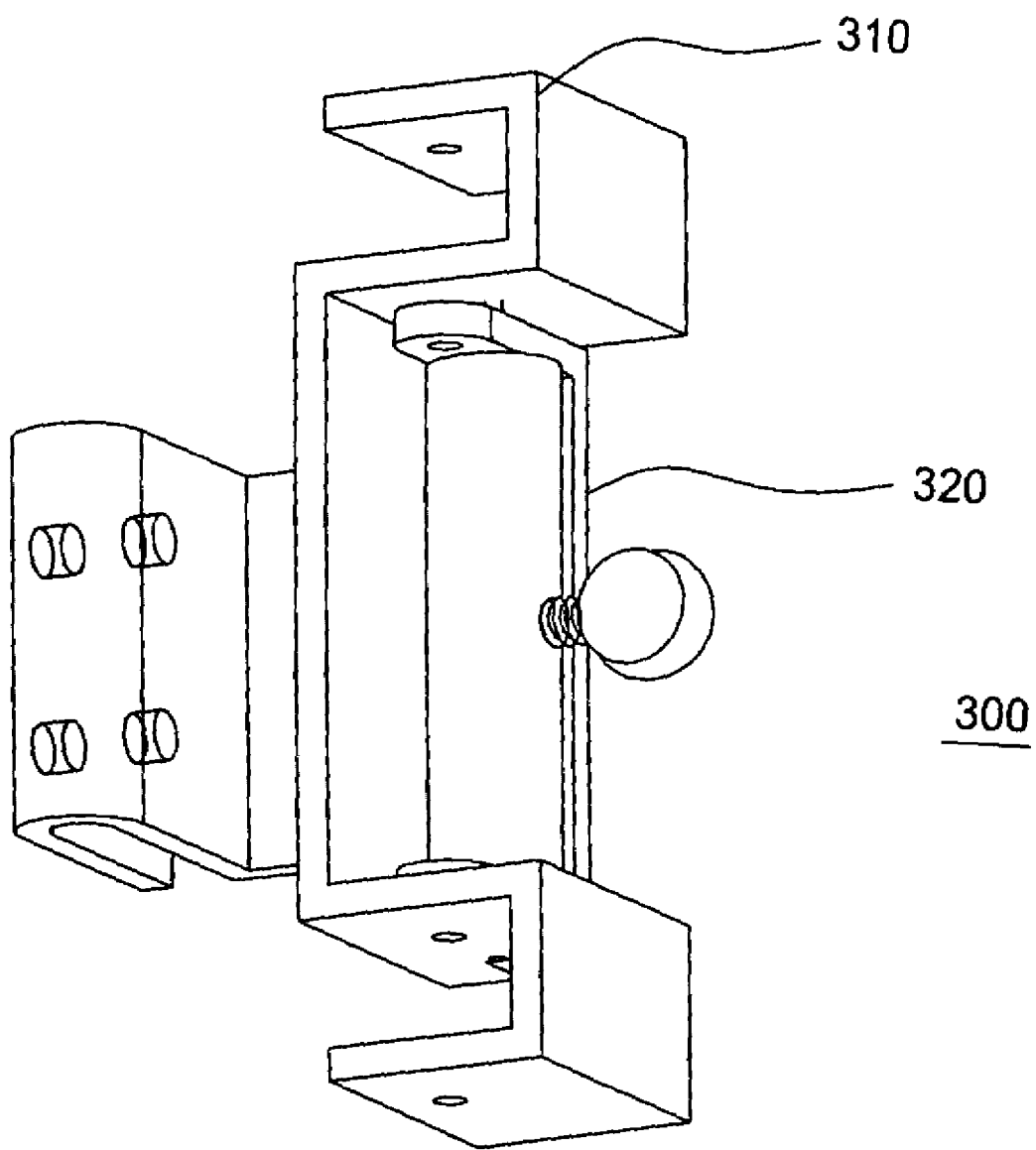
FIG. 3 is a front perspective view of an embodiment of a belt cinch.

FIG. 3 is a front perspective view of one embodiment of a belt cinch 300 according to an embodiment of the present invention. In one embodiment, the belt cinch 300 comprises a cinch body 310 and a cam carrier assembly 320. Both the cinch body 310 and the cam carrier assembly 320 are individually illustrated in further detail in the following figures. The cam carrier assembly 320 is coupled to the cinch body 310, so that when the belt cinch 300 is installed on a safety belt system (e.g., system 100), the cinch body 310 provides a means for attaching the belt cinch 300 to the safety belt system 100, and the cam carrier assembly 320 provides for a means for securing the safety belt system 100 in a desired position. The cam carrier assembly 320 includes a cam (illustrated in further detail in FIG. 4) that is adapted to urge and retain at least a portion of the seat belt webbing 120 against cinch body 310, thereby preventing loosening of at least the lap belt portion 192 of the seat belt webbing 120. Thus, at least the lap belt portion 192 is locked in place. The belt cinch 300 can be advantageously adapted for use with an existing safety belt system (e.g., system 100), or manufactured as an integral part of a safety belt system, for enhancing the restraint of movement of a safety belt system user.

The belt cinch 300 illustrated in FIG. 3 includes a separate cinch body 310 and cam carrier assembly 320 (i.e., as opposed to one integral piece comprising a cinch body 310 and cam carrier assembly 320), and is particularly well suited for retrofit with existing seat belt systems. In retrofit situations, the seat belt webbing 120 must be inserted between the cam of the cam carrier assembly 320 and the cinch body 310. Since the webbing 120 is permanently attached to the car at both ends 121a and 121b, the cam carrier assembly 320 must be separable from the cinch body 310 to permit insertion of the webbing 120. In original equipment manufacturer (OEM) embodiments, the manufacturer can insert the belt webbing 120 before attaching the cam to the cinch body 310. In this latter instance, the cam carrier assembly 320 is not required, and the belt cinch 300 may be manufactured as a single integral piece.

The belt cinch 300 is designed to grip in one direction only. This means that the lap belt portion 192 of the seat belt webbing 120 can be pulled tight manually by grasping the shoulder belt portion 190 just above the tongue assembly 150 and pulling away from the tongue assembly 150. However, the belt cinch 300 prevents the lap belt portion 192 from loosening by locking in place to resist or prevent lengthening of the lap belt portion 192. However, in the event of an accident, the seat belt pre-tensioner engages, and the shoulder belt portion 190 is pulled tight automatically (nearly instantaneously) and with great force. The belt cinch 300 will permit the lap belt portion 192 to be further tightened by the pre-tensioner if the pre-tensioner force is greater than the manually-imposed lap belt tension. This safety feature is appropriate to prevent minimization or negation of the inherent safety features built into standard seat belts.

Figure 4:
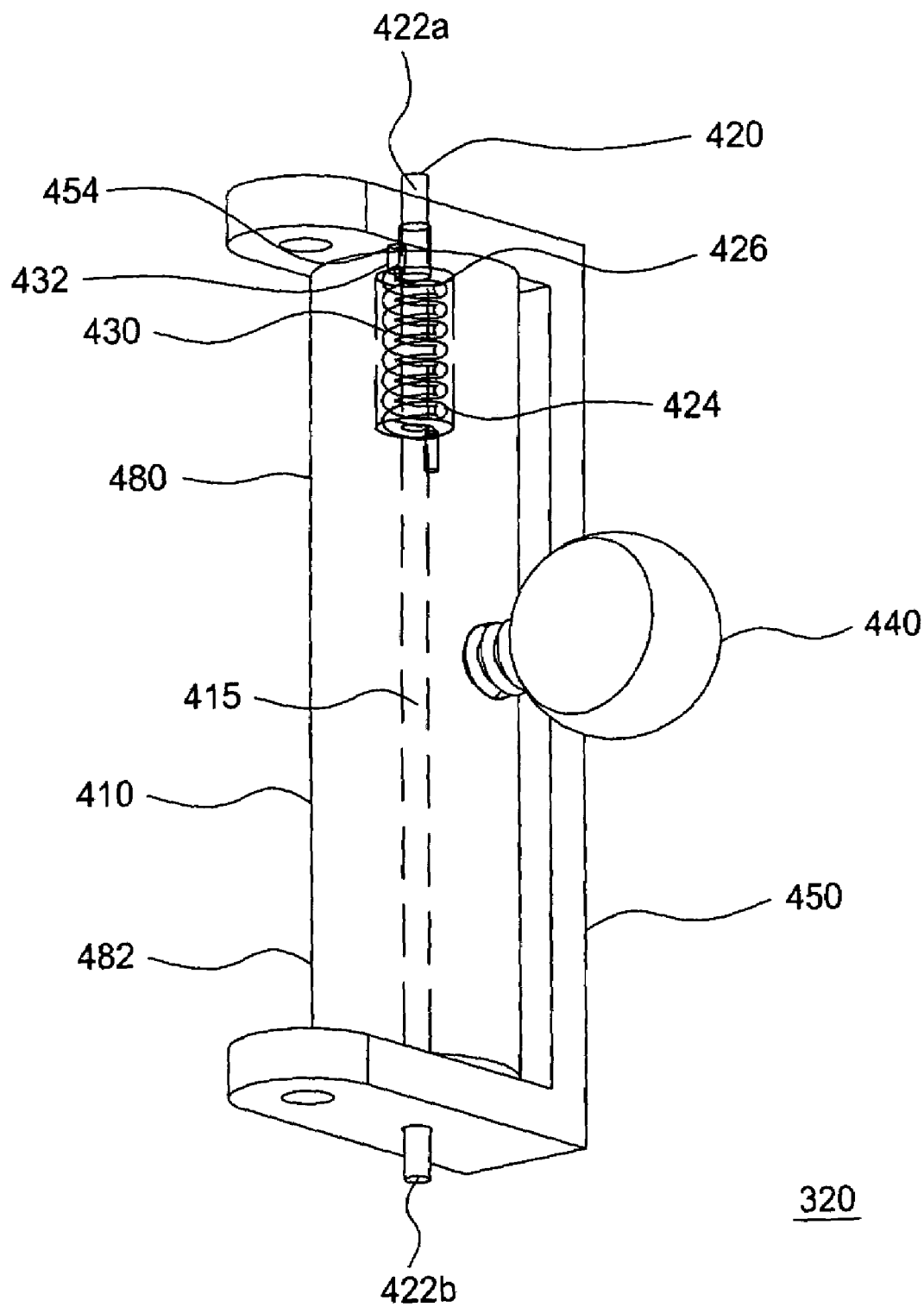
FIG. 4 depicts one embodiment of a cam carrier assembly.

FIG. 4 depicts one embodiment of the cam carrier assembly 320 for use in the belt cinch 300 illustrated in FIG. 3. The cam carrier assembly 320 comprises a cam 410, a cam axle 420, a biasing member 430, a release arm 440, and a main carrier body 450. For clarity, the cam 410, cam axle 420, biasing member 430 and release arm 440 are also further illustrated, in an exploded view, in FIG. 5.

Figure 5:
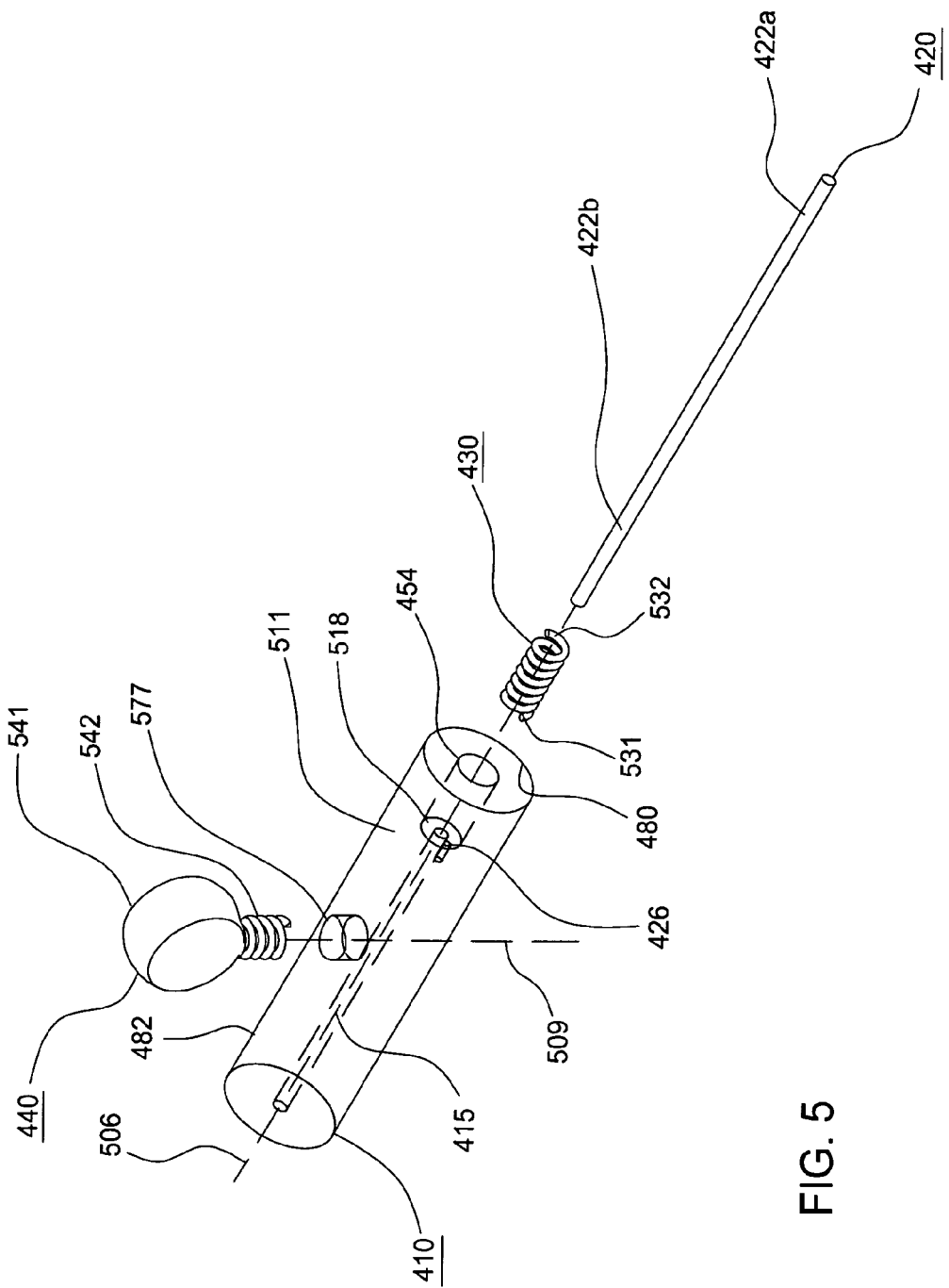
FIG. 5 depicts an exploded view of one embodiment of a cam, a cam axle, a torsion spring, and a release arm.

Referring simultaneously to FIGS. 4 and 5, in one embodiment, the cam 410 is substantially solid and cylindrical in shape, and has first and second ends 480 and 482. The cam 410 includes a longitudinal, off-center bore 415, a counter bore 424, and a release arm aperture 577. The longitudinal, off-center bore 415 extends through the body of the cam 410, and the counter bore 424 is formed in the bore 415, proximate to the first end 480 of the cam 410. The counter bore 424 is substantially coaxial with the bore 415. In one embodiment, the counter bore further comprises a shallow cylindrical aperture 426 formed therein and extending further inward along the longitudinal axis (506 in FIG. 5) of the cam 410. The cylindrical aperture 426 is located within the boundaries of the counter bore 424, offset from the bore 415.

The bore 415 is sized to receive the cam axle 420, and the counter bore 424 is sized to receive the biasing member 430, as described further below. The release arm aperture 577 is formed in the body of the cam 410 at an intermediate point on the cam's longitudinal axis 506, and in one embodiment has a depth that is slightly shallower than a radius of the cam 410. In one embodiment, the release arm aperture 577 is a threaded hole; in further embodiments, the release arm aperture 577 is a through hole. In one embodiment, the cam 410 is manufactured from a strong, rigid material such as aluminum rod, steel rod (e.g., stainless or carbon steel, or the like), metal tubing filled with hard plastic or epoxy, hard structural engineering plastic, carbon fiber, glass/epoxy/fiberglass, titanium, lucite, structural engineering plastics, or magnesium, among others. In further embodiments, the outer surface of the cam 410 is textured (for example, with gripping devices such as knurling, striations, attached grip paper, rubber coatings, and the like) to improve the rotation of the cam 410 and locking to the seat belt webbing 120.

The cam axle 420 is a long, substantially thin shaft that has a first end 422a and a second end 422b, and is manufactured of a rigid material. In one embodiment, the cam axle 420 is manufactured from steel, iron or a composite having suitable characteristics (e.g., rigidity and strength). In another embodiment, the cam axle 420 is manufactured from carbon fiber, glass/epoxy/fiberglass, titanium, lucite, structural engineering plastic, magnesium, or the like. The cam axle 420 is sized to be inserted into the bore 415 of the cam 410 so that the first and second ends 422a and 422b of the cam axle 420 protrude, respectively, from the ends 480 and 482 of the cam 410. Thus, the diameter of the cam axle 420 is slightly smaller than the diameter of the bore 415, and the length of the cam axle 420 is substantially longer then the body of the cam 410, such that when the cam carrier assembly 320 is completely assembled, the cam axle 420 extends evenly past both ends 422a and 422b of the cam 410. In one embodiment, the cam axle 420 can be machined as part of the cam 410. In another embodiment, the cam axle 420 is not a single shaft that extends all the way through the cam 410, but alternatively comprises two shorter shafts that respectively protrude from each end 480, 482 of the cam 410. In further embodiment, the cam axle 420 may be spring loaded to facilitate mounting to the cinch assembly.

The biasing member 430 is supported on the first end 422a of the cam axle 420 and is sized to fit within the counter-bore 424 in the cam 410, the counter bore 424 having a center on the same axis as the cam axle 420 (i.e., the cam axle 420 passes through the center of the counter bore 424). In one embodiment, the biasing member 430 is a torsion spring having an internal end 531 and an external end 532, and the counter bore 424 in the cam 410 has an axial length that is slightly shorter than the relaxed (i.e., uncompressed) length of the torsion spring. The internal end 531 of the biasing member (e.g., torsion spring) 430 is inserted into the longitudinal aperture 426 formed in the counter-bore 424. Thus, in one embodiment, the longitudinal aperture has a diameter slightly larger than a wire diameter of the torsion spring 430.

With respect to the use of a torsion spring as the biasing member 430, it is noted that rotational tension on the cam 410 is not strictly necessary since the belt cinch 300 can be locked manually using the release arm 440 (e.g., rotating the release arm 440 in a reverse direction of that used to release the belt cinch 300, as described further below). Moreover, the energy normally applied by the torsion spring may be alternatively applied using a different type of spring, using a wire or other method or apparatus adapted to urge the cam 410 to rotate. In fact, in one embodiment of the invention, a source for such torsion is unnecessary. In this embodiment, a piece of foam, cloth or other material is disposed upon the body of the cam 410 in a manner that pushes the webbing 120 against the cam 410, thus enabling friction between the webbing 120 and cam 410 to provide the necessary force to actuate the cam 410.

The release arm 440 is adapted to rotate the cam 410 about the cam axle 420. In one embodiment, the release arm 440 is a threaded thumb screw comprising a head 541 and a shaft 542. The release arm 440 engages the release arm aperture 577 formed on the body of the cam 410, so that the release arm is secured to the cam 410 and projects from the cam 410 at an angle substantially normal to the longitudinal axis 506 of the cam 410 (i.e., the release arm aperture 577 has a longitudinal axis 509 that is substantially orthogonal to the longitudinal axis 506 of the cam 410). In one embodiment, at least a portion of the shaft 542 is threaded to engage threads formed in the release arm aperture 577 formed in the cam 410, thereby securing the release arm 440 to the cam 410. Although the release arm 440 depicted in FIG. 5 is a threaded thumbscrew, other fasteners or affixing methods such as epoxy, soldering, or welding, among others, can be used to secure the release arm 440 to the body of the cam 410. The release arm 440 is manufactured of a substantially rigid structural material, and in one embodiment is manufactured of steel or aluminum. In another embodiment, the release arm 440 is manufactured of carbon fiber, glass/epoxy/fiberglass, titanium, lucite, structural engineering plastics, magnesium, or the like.

Figure 6:
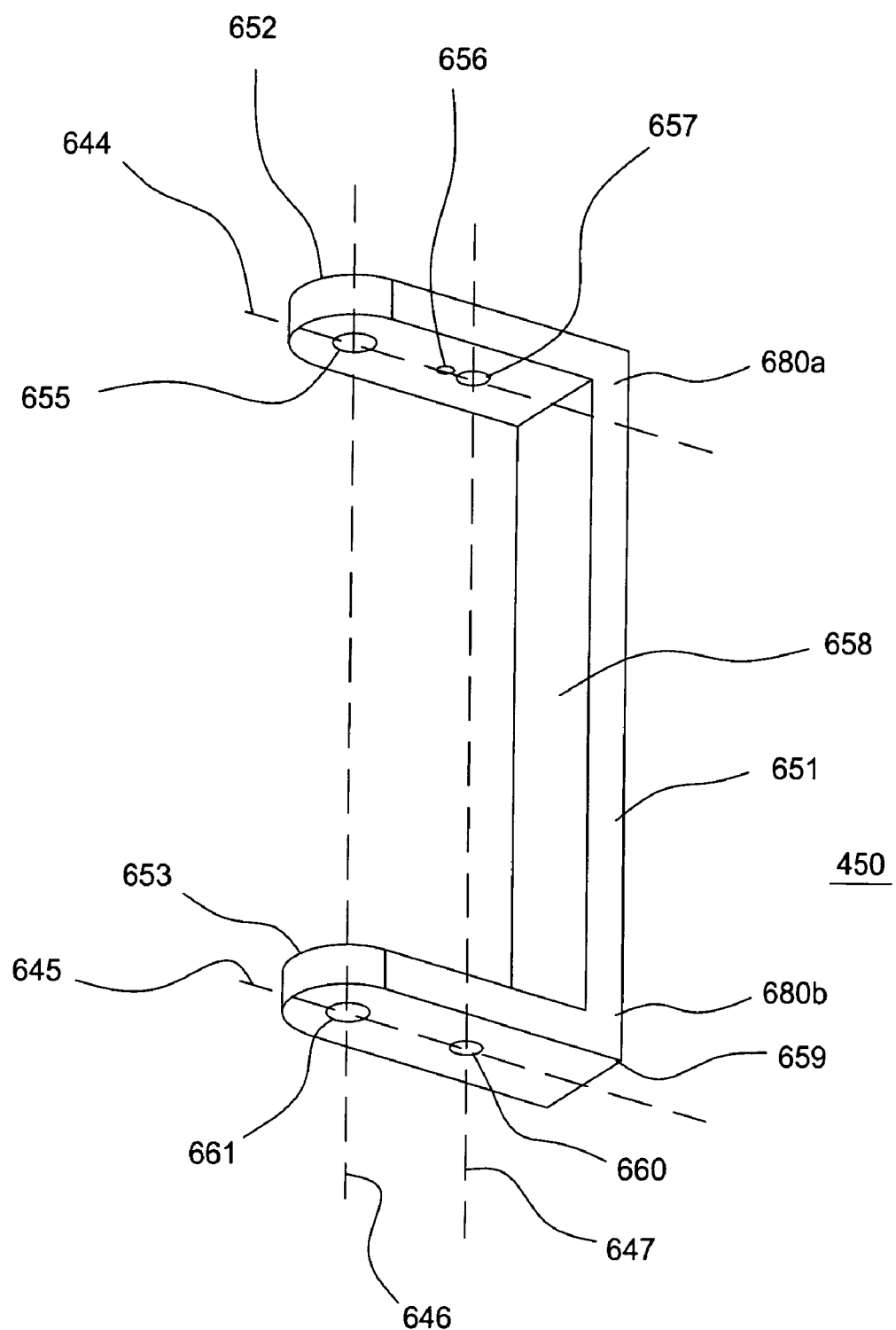
FIG. 6 depicts an embodiment of a main carrier body.

FIG. 6 illustrates a detailed view of one embodiment of the main carrier body 450. Referring simultaneously to FIGS. 4 and 6, the main carrier body 450 is adapted for supporting the cam 410 in a position that enables the cam 410 to rotate about the cam axle 420. The main carrier body 450 comprises an elongated, bracket shaped frame 651 that includes a substantially flat base 658 having first and second parallel flanges 652 and 653 extending from first and second ends 680a and 680b thereof. The main carrier body 450 is manufactured of a rigid structural material, and in one embodiment, the main carrier body 450 is manufactured of steel or aluminum. In another embodiment, the main carrier body 450 is manufactured from carbon fiber, glass/epoxy/fiberglass, titanium, lucite, structural engineering plastics, magnesium or the like. In one embodiment, the base 658 has a length and a width that are roughly equivalent to, or slightly larger than, the length and width of the cam 410. The first flange 652 includes first, second and third cylindrical openings 655, 656, and 657, and the second flange 653 includes fourth and fifth cylindrical openings 660 and 661. In one embodiment, the cylindrical openings 655, 656, 657, 660 and 661 are through holes formed in the first and second flanges 652 and 653.

The first cylindrical opening 655 extends axially through the first flange 652. The first cylindrical opening 655 is centered on a first axis 644, which is perpendicular to the base 658 of the main carrier body 450 and is located on the first flange 652 at a point further from the base 658 than the second cylindrical opening 656 and the third cylindrical opening 657. The second cylindrical opening 656 also extends axially through the first flange 652. The second cylindrical opening 656 is centered on the first axis 644 and is located on the first flange 652 at a point further from the base 658 than the third cylindrical opening 657 but closer to the base 658 than the first cylindrical opening 655. The diameter of the second cylindrical opening 656 is slightly larger than the diameter of the biasing member/torsion spring 430. The third cylindrical opening 657 extends axially through the first flange 652. The third cylindrical opening 657 is centered on the first axis 644 and is located on the first flange 652 at a point closer to the base 658 than the second cylindrical opening 656 and the first cylindrical opening 655. The diameter of the third cylindrical opening 657 is slightly larger than the diameter of the cam axle 420. The first cylindrical opening 655 and the third cylindrical opening 657 are separated along the first axis 644 by a distance greater than the diameter of the cam 410.

The second flange 653 of the main carrier body 450 includes fourth and fifth cylindrical openings 660 and 661. In one embodiment, the fourth and fifth cylindrical openings 661 and 660 are through holes formed in the second flange 653. The fourth cylindrical opening 660 extends axially through the second flange 653. The fourth cylindrical opening 660 is centered on a second axis 645, which is substantially perpendicular to the base 658 of the main carrier body 450 and substantially parallel to the first axis 644. The fourth cylindrical opening 660 is located on the second flange 653 at a point closer to the base 658 than the fifth cylindrical opening 661. The diameter of the fourth cylindrical opening 660 is slightly larger than the diameter of the cam axle 420. The fifth cylindrical opening 661 also extends axially through the second flange 653. The fifth cylindrical opening 661 is centered on the second axis 645 and is located on the second flange 653 at a point further from the base 658 than the fourth cylindrical opening 660. The fourth cylindrical opening 660 and the fifth cylindrical opening 661 are separated along the second axis 645 by a distance greater than the diameter of the cam 410.

The first cylindrical opening 655 of the first flange 652 and the fifth cylindrical opening 661 of the second flange 653 of the main carrier body 450 are collinear along a third axis 646, which is parallel to the base 658 of the main carrier body 450. The third cylindrical opening 657 of the first flange 652 and the fourth cylindrical opening 660 of the second flange 653 of the main carrier body 450 are collinear along a fourth axis 647, which is parallel to the base 658 of the main carrier body 450 and to the third axis 646.

Referring simultaneously to FIGS. 4–6, the assembled cam 410, cam axle 420, biasing member 430, and release arm 440 are mounted onto the main carrier body 450. The first end 480 of the cam 410 is mounted toward the first flange 652 of the main carrier body 450. The assembly is installed into the main carrier body 450 by inserting the first end 422a of the cam axle 420, which protrudes from the first end 480 of the cam 410 into the third cylindrical opening 657 of the first flange 652 of the main carrier body 450. In one embodiment, the external leg 532 of the biasing member/torsion spring 530 is inserted into the second cylindrical opening 656 of the first flange 652 of the main carrier body 450. The second end 482 of the cam 410 is mounted toward the second flange 653 of the main carrier body 450. In one embodiment, the second end 422b of the cam axle 420 is inserted into the fourth cylindrical opening 660 of the second flange 653 of the main carrier body 450 by applying pressure in an inward direction to the first end 422a of the cam axle 420 until the cam axle 420 protrudes evenly from both the first end 480 and the second end 482 of the cam 410.

The cam carrier assembly 320 is thus assembled for mounting onto the cinch body 310, as discussed in further detail below.

Although one specific embodiment of the cam 410, the cam axle 420, the torsion spring 430, the release arm 440, and the main carrier body 450 are depicted in FIGS. 4–6, it will be appreciated by those skilled in the art that minor alterations to the dimensions of the above described components and slight variations in the methods of interconnection between these components will still be considered to be within the scope of the present invention.

Figure 7:
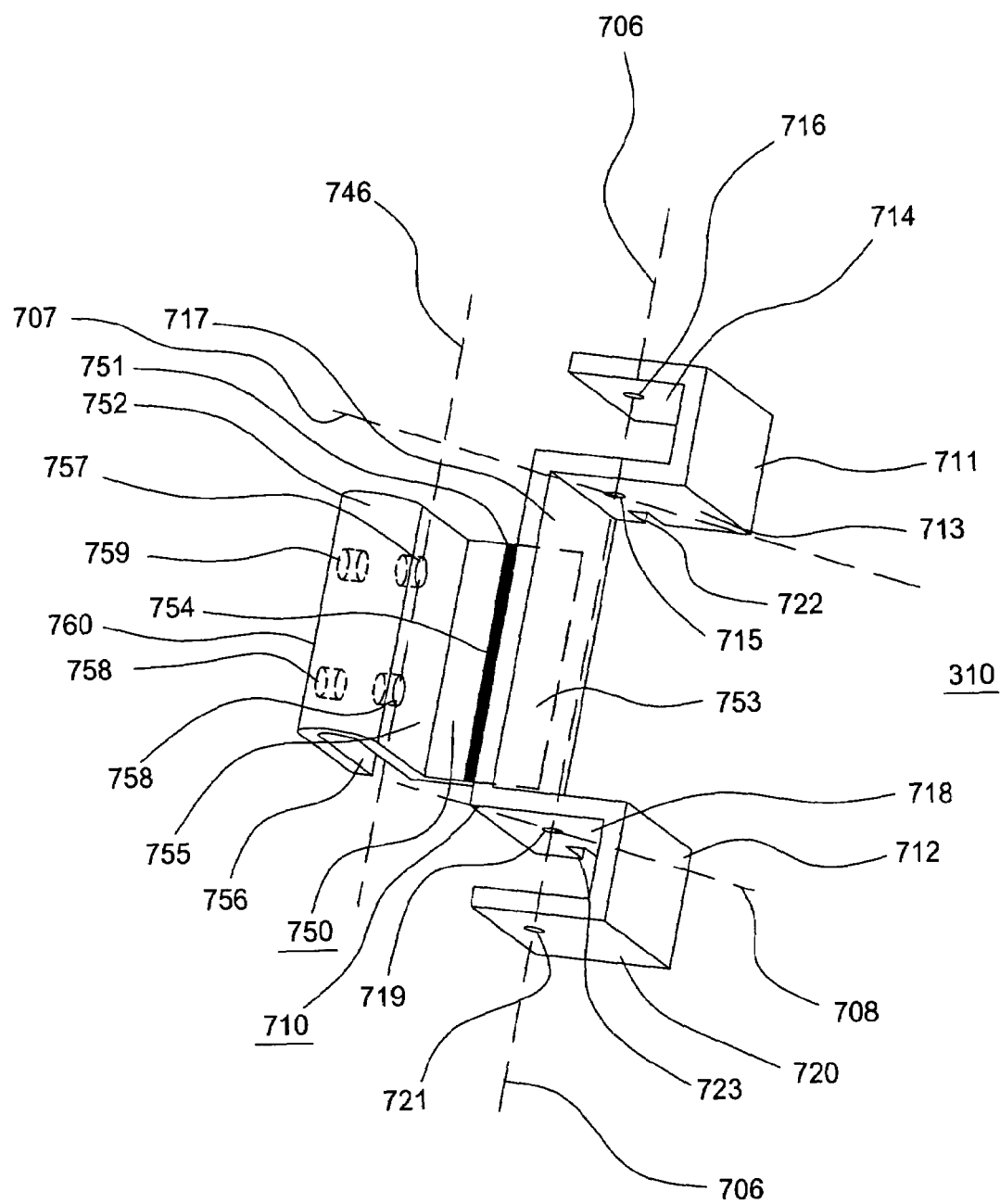
FIG. 7 depicts an embodiment of a cinch body.

FIG. 7 depicts one embodiment of a cinch body 310. The cinch body 310 of FIG. 7 illustratively comprises a first frame 710 coupled to a second frame 750. In one embodiment, the first and second frames 710 and 750 are formed as an integral, single piece; in another embodiment, the first and second frame 710 and 750 comprise two separate frames coupled together, for example by welding. The cinch body 310 is manufactured of a rigid structural material, and in one embodiment is manufactured of steel or aluminum. In another embodiment, the cinch body 310 is manufactured of carbon fiber, glass/epoxy/fiberglass, titanium, lucite, structural engineering plastics, magnesium or the like.

In one embodiment, an elongated, channel-shaped first frame 710 comprises a base 753 and first and second arms 711 and 712. The first and second arms 711 and 712 extend from opposite ends of the base 753 in a substantially parallel orientation relative to each other. In one embodiment, the first and second arms 711 and 712 are substantially identical, and each comprises a U-shaped channel, coupled at one end to the base 753 and bent outwardly from the base 753 at approximately a 180 degree angle. The U-shape provides stability when the cam carrier assembly 320 is attached to the cinch body 310 by providing two parallel side walls (713 and 714 for the first arm 711, and 718 and 720 for the second arm 712) for supporting each axial end of the cam carrier assembly 320. In further embodiments, the shape of the arms 711 and 712 is modified to provide one side wall for supporting each axial end of the cam carrier assembly 320.

The first wall 713 of the first arm 711 includes a first cylindrical opening 715, which in one embodiment is a through hole. The first cylindrical opening 715 extends axially through the first arm 711 and is centered on a first axis 706, which is parallel to the base 753 of the first frame 710. The second wall 714 includes a second cylindrical opening 716, which in one embodiment is also a through hole. The second cylindrical opening 716 extends axially through the second wall 714 and is also centered on the first axis 706, so that the second cylindrical opening 716 is collinear with the first cylindrical opening 715 formed in the first wall 713 along the first axis 706.

The first wall 713 further comprises a first notch 722, disposed adjacent to the first cylindrical opening 715 and facing toward the second arm 712. The width of the first notch 722 is slightly greater than the diameter of the cam axle 420. The depth of the first notch 722 is such that when the cam carrier assembly 320 is mounted to the cinch body 310, the cam axle 420 can travel within the depth of the first notch 722 enough to align the first cylindrical opening 655 in the first flange 652 of the main carrier body 450 with the first cylindrical opening 715 in the first arm 711 of the cinch body 310. The first cylindrical opening 715 in the first arm 711 of the cinch body 310 and the first notch 722 in the first wall 713 are centered on a second axis 707, which is substantially perpendicular to the first axis 706. The first notch 722 on the first arm 711 of the cinch body 310 is positioned such that the first notch 722 is located outward of the base 753 of the cinch body 310. This positioning of the first notch 722 allows the cam 410 to come into direct contact with the base 753 of the first frame 710 cinch body 310 when the cam 410 rotates about its off-center cam axle 420, (i.e., before the release arm 440 comes into contact with the main carrier body 450).

The U-shaped second arm 712 of the first frame 710 comprises a first wall 718 and a second wall 720, which are disposed substantially parallel to each other. The first wall 718 includes a third cylindrical opening 719, which extends axially through the first wall and is also centered on the first axis 706, substantially collinear along the first axis 706 with the first and second cylindrical openings 715 and 716 in the first arm 711. The second wall 720 includes a fourth cylindrical opening 721. The fourth cylindrical opening 721 extends axially through the first wall 720 and is also centered on the first axis 706, substantially collinear along the first axis 706 with the third cylindrical opening 719 and with the first and second cylindrical openings 715 and 716 in the first arm 711.

The first wall 718 of the second arm 712 includes a second notch 723 disposed adjacent to the third cylindrical opening 719 and facing toward the first arm 711. The second notch 723 is axially aligned with the first notch 722 in the first arm 711 along an axis substantially parallel to the base 753 of the first frame 710. The width of the second notch 723 is slightly greater than the diameter of the cam axle 720. The depth of the second notch 723 is such that when the cam carrier assembly 320 is mounted to the cinch body 310, the cam axle 420 can travel within the depth of the second notch 723 enough to align the fifth cylindrical opening 661 in the second flange 653 of the main carrier body 450 with the third cylindrical opening 719 in the second arm 712 of the cinch body 310. The third cylindrical opening 719 in the first arm 712 of the cinch body 310 and the second notch 723 in the first wall 718 are centered on a third axis 708 which is substantially parallel to the second axis 707. The second notch 723 is located on the second arm 712 of the cinch body 310 at a point outward of the base 753 of the first frame 710 of the cinch body 310. The location of the second notch 723 allows the cam 410 to come into direct contact with the base 753 when the cam 410 rotates about its off-center cam axle 420 (i.e., before the release arm 440 comes into contact with the main carrier body 450).

The second frame 750 of the cinch body 310 illustrated in FIG. 7 comprises a channel shaped body having a base 751 and a U-shaped arm 752 extending perpendicularly from one longitudinal side thereof. The U-shaped arm comprises first and second parallel walls 755 and 756. A longitudinal side of the base 751 of the second frame 750 that is opposite the U-shaped arm 752 is coupled to the base 753 of the first frame 710. The base 751 of the second frame 750 is and disposed substantially perpendicular to the base 753 of the first frame 710, so that the U-shaped arm 752 is orientated substantially parallel to the base 753.

The U-shaped arm 752 of the second frame 750 is bent towards the outside of the base 751 at approximately a 180 degree angle. The U-shape provides stability when a tongue assembly is attached to the cinch body 310, by providing two parallel walls 755 and 756 to support and couple to the tongue assembly. In another embodiment, the arm 752 of the second frame 750 comprises a single wall (e.g., wall 755) that provides sufficient stability when a tongue assembly is attached to the cinch body 310. The first wall 755 includes first and second cylindrical openings 757 and 758. The first and second cylindrical openings 757 and 758 extend axially through the first wall 755, and are separated by a small distance along a fourth axis 746 that is substantially parallel to the base 753 of the first frame 710. The first and second cylindrical openings 757 and 758 are centered on the fourth axis 746. In one embodiment, the first and second cylindrical openings 757 and 758 are threaded through holes. The second wall 756 includes third and fourth cylindrical openings 759 and 760, which are substantially similar to the first and second cylindrical openings 757 and 758 and in one embodiment comprise threaded through holes. The third and fourth cylindrical openings 759 and 760 extend axially through the second wall 756. In one embodiment, the third cylindrical opening 759 is axially aligned with the first cylindrical opening 757, and the fourth cylindrical opening 760 is axially aligned with the second cylindrical opening 758.

In one embodiment, the first end 422a of the cam axle 420, which protrudes from the cam 410, is inserted into the first notch 722 (located in the first wall 713 of the first arm 711 of the first frame 710) to mount the cam carrier assembly 320 to the cinch body 310. The second end 422b of the cam axle 420, which protrudes from the cam 410, is inserted into the second notch 723 (located in the first wall 718 of the second arm 712 of the first frame 710). The cam carrier assembly 320 is translated forward along the depths of the first notch 722 and the second notch 723 until the first cylindrical opening 655 in the first flange 652 of the main carrier body 450 is aligned with the first cylindrical opening 715 in the first arm 711 of the first frame 710, and the fifth cylindrical opening 660 in the second flange 653 of the main carrier body 450 is aligned with the first cylindrical opening 719 in the second arm 712 of the first frame 710.

In one embodiment, a fastening device (e.g., a screw, pinch or compression clamp, a bolt, a set screw, a wire, a pin, or the like) is inserted through the second cylindrical opening 716 and the first cylindrical opening 715 of the first arm 711 of the first frame 710 of the cinch body 310, and also through the first cylindrical opening 655 in the first flange 652 of the main carrier body 450, to secure the cam carrier assembly 320 to the cinch body 310. Additionally, a fastening device is inserted through the second cylindrical opening 721 and the first cylindrical opening 719 of the second arm 712 of the first frame 710 of the cinch body 310, and also through the fifth cylindrical opening 660 in the second flange 653 of the main carrier body 450 to secure the cam carrier assembly 320 to the cinch body 310. In further embodiments, adhesive, adhesive tape, epoxy, or like non-mechanical fastening can be used in place of a fastening device.

In further embodiments of the present invention, the cam, cam carrier assembly, cinch body, screws, and other components may be chrome plated or anodized for aesthetics and/or to prevent corrosion or wear.

Figure 8:
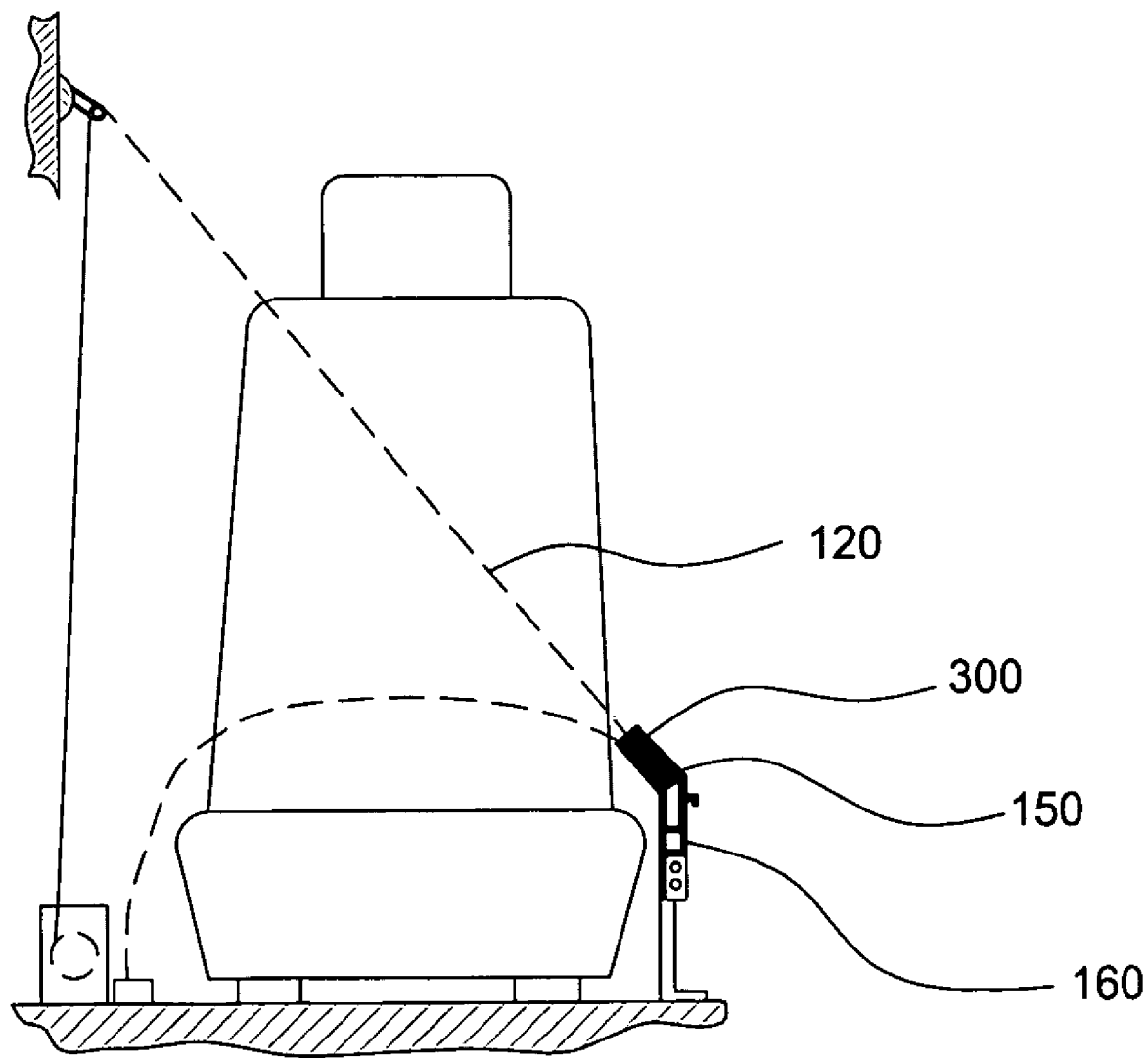
FIG. 8 depicts an embodiment of a belt cinch attached to a typical, factory-installed, three-point, continuous loop seat belt system.

FIG. 8 depicts an embodiment of a belt cinch 300 attached to the tongue of a conventional factory-installed, three-point, continuous loop seat belt system such as the system 100 depicted in FIGS. 1A and 1B. In FIG. 8, the belt cinch 300 is attached to the tongue assembly 150 on the seat belt webbing 120 of the seat belt system 100 of FIG. 1. The tongue assembly 150 of FIG. 8 is depicted as engaging the buckle 160. The belt cinch 300 is locked to the tongue assembly 150 and thereby onto the seat belt webbing 120 to prevent loosening of the seat belt system 100 lap belt (that is, between the tongue and the floor anchor, thus restraining the movement of an individual using the seat belt system 100.

Figure 9:
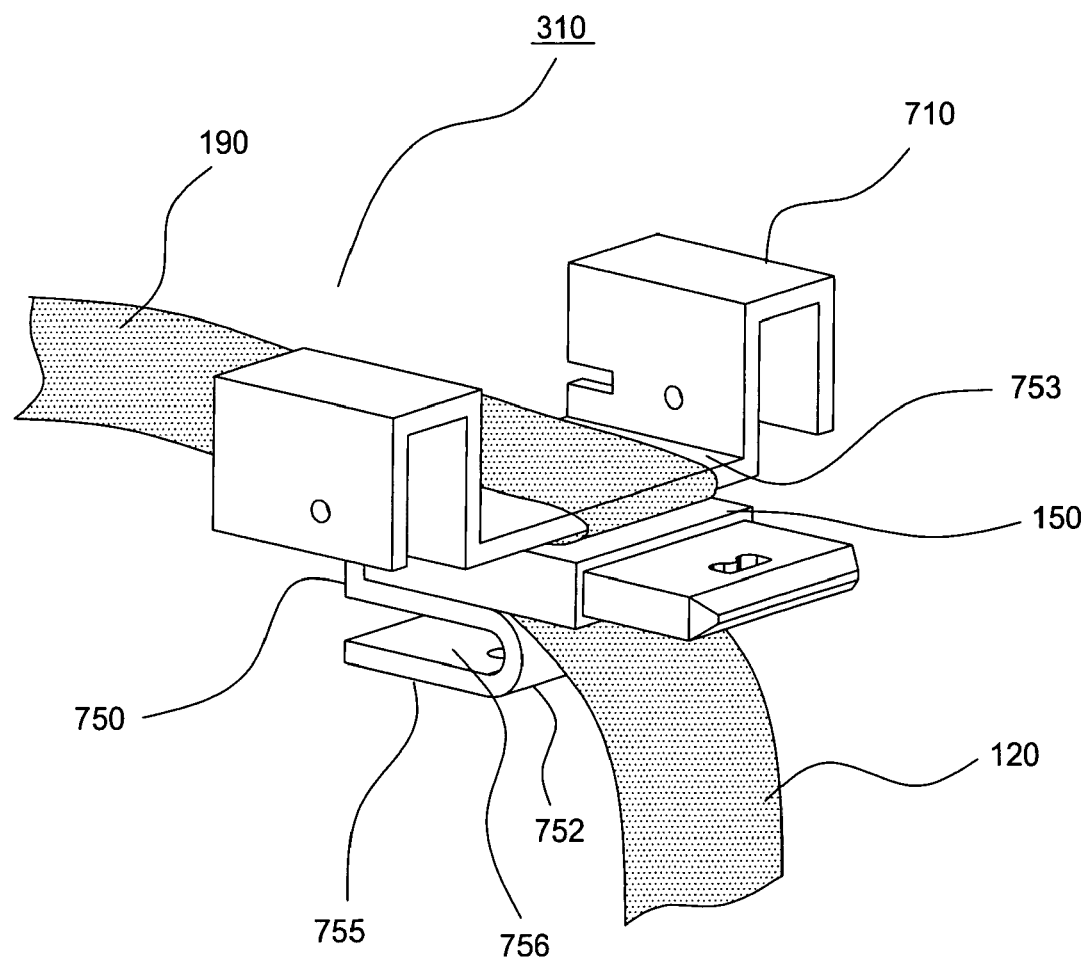
FIG. 9 depicts the installation of a cinch body to a tongue assembly of a typical, factory-installed, three-point, continuous loop seat belt system.

FIG. 9 depicts the installation of a cinch body (e.g., the cinch body 310 illustrated in FIG. 3 and FIG. 7) to a tongue assembly of a conventional, factory-installed, three-point, continuous loop seat belt system such as the seat belt system 100 of FIG. 1A and FIG. 1B. The rear portion of the tongue assembly 150 is inserted into the second frame 750 of the cinch body 310 with the top face of the tongue assembly 150 facing the first frame 710 of the cinch body 310. In one embodiment, fastening devices (e.g., screws, bolts, set screws, or the like) (not shown) are inserted first, through the third and fourth threaded cylindrical openings (759 and 760 in FIG. 7) of the second wall 756 of the arm 752 of the second frame 750. The fastening devices are further inserted through to the first and second cylindrical openings (757 and 758 in FIG. 7) of the first wall 755 of arm 752 to fasten the tongue assembly 150 to the second frame 750 of the cinch body 310. The shoulder portion 190 of the seat belt webbing 120 is laid substantially flat (i.e., ensuring that there are no twists in the seat belt webbing 120) across the base 753 of the first frame 710.

Figure 10:
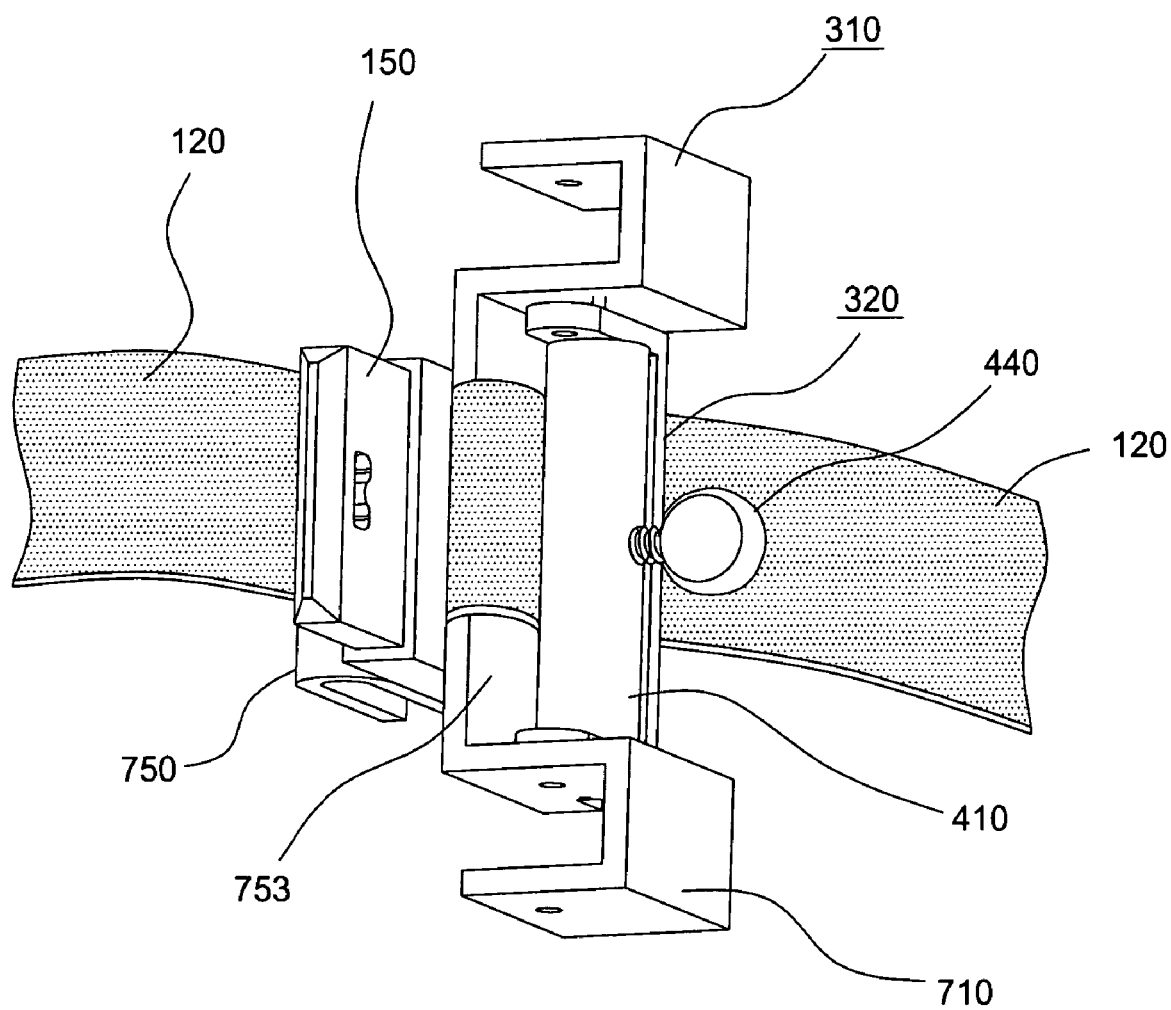
FIG. 10 depicts the installation of a cam carrier assembly to the cinch body attached to the tongue assembly of the seat belt system of FIG. 9.

FIG. 10 depicts one method for coupling the cam carrier assembly 320 to the cinch body 310 (i.e., when the cinch body 310 has been attached to the tongue assembly 150 of the seat belt system 100, as illustrated in FIG. 9). The cam carrier assembly 320 is mounted to the cinch body 310 according to the method described above, ensuring that the seat belt webbing 120 is routed between the base 753 of the first frame 710 of the cinch body 310 and the cam 410 of the cam carrier assembly 320.

The tongue assembly 150 and the belt cinch 300 can be moved up and down the seat belt webbing 120 by moving the release arm 440 toward the tongue assembly 150 and sliding the tongue assembly 150 and the belt cinch 300 together along the seat belt webbing 120. Movement of the release arm 440 causes the cam 410 to rotate about the cam axle 420, and when the off-center mounted cam 410 rotates to a "release" position, a gap between the cam 410 and the cinch body 310 is created, allowing the seat belt webbing 120 to pass freely therebetween. When the release arm 440 is released, the cam 410 rotates back to a "set" position, and the tongue assembly 150 and belt cinch 300 are locked in place.

Figure 11:
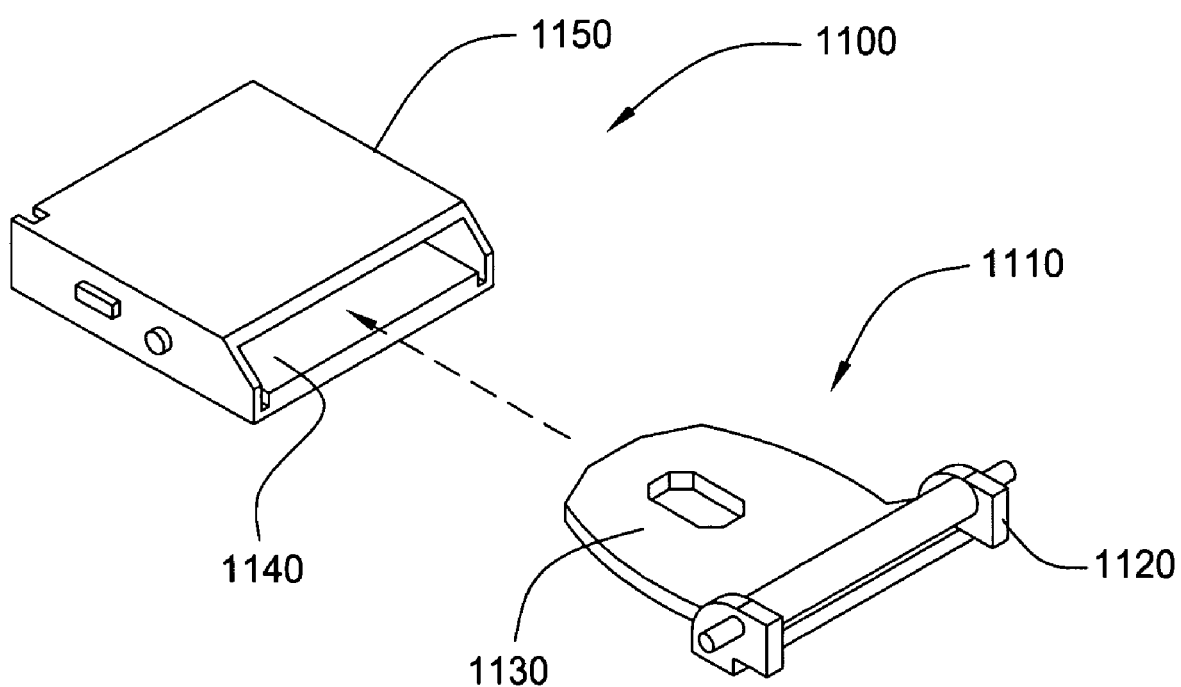
FIG. 11 depicts an alternate embodiment of a belt cinch in accordance with the present invention.

FIG. 11 depicts an alternate embodiment of a belt cinch 1100 in accordance with the present invention. In the embodiment of FIG. 11, the belt cinch 1100 is incorporated into a tongue assembly 1110 of a seat belt system. As such, a cam carrier assembly 1120 such as that illustrated in FIG. 4 is mounted to the tongue 1130 and cinch body assembly 1140 such as that illustrated in FIG. 7 is incorporated into the buckle 1150.

Figure 12:
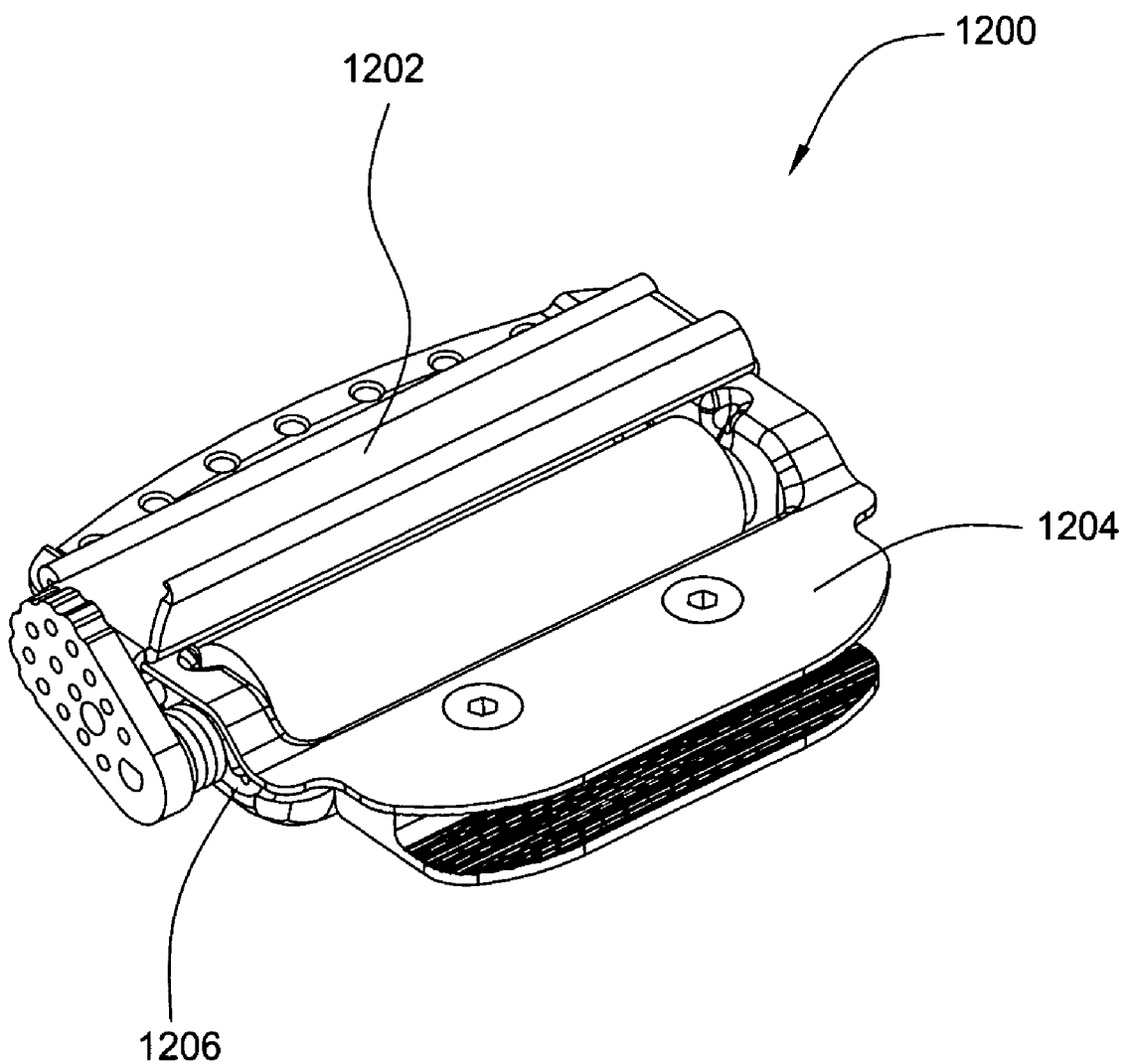
FIG. 12 depicts another alternate embodiment of a belt cinch in accordance with the present invention.

FIG. 12 depicts another embodiment of a belt cinch 1200 according to the present invention. In this embodiment, a slider 1202 is adapted to slide over at least a portion of a cam housing 1204 to selectively permit or not permit the webbing to be positioned (i.e., trapped or pinched) between the slider and the cam 1206. With the slider over the cam, the belt cinch is "enabled" (operational). With the slider not over the cam, or completely removed, the belt cinch is disabled (transparent to the seat belt system).

Figure 13:
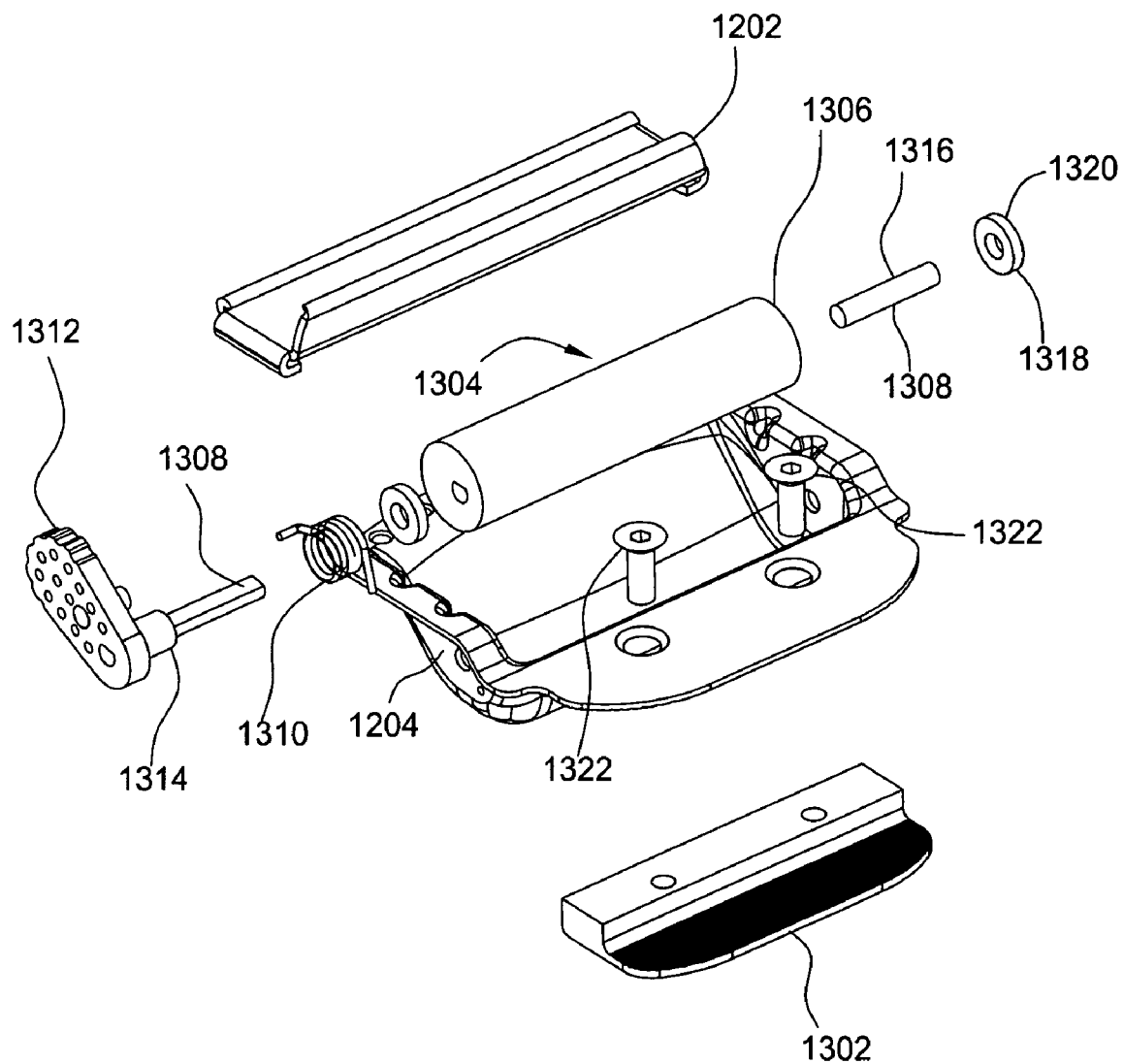
FIG. 13 depicts an exploded view of the belt cinch illustrated in FIG. 12.

FIG. 13 further illustrates the components of the belt cinch 1200 in an exploded view. The belt cinch 1200 comprises a slider 1202, a clamp plate 1302, a cam assembly 1304, and a cam housing 1204. The cam housing 1204 houses the cam assembly 1304 and is adapted to retain the cam assembly 1304 in place relative to a portion of a safety belt webbing. The slider 1202 is adapted to be removable, be positioned behind the cam, or to slide over a portion of the cam housing 1204, directly above the cam assembly 1304.

The clamp plate 1302 is coupled to the cam housing 1204 and is adapted to secure the belt cinch 1200 to a tongue assembly.

The cam assembly 1304 comprises a cam 1306, a cam axle 1308, a biasing member 1310, and a lever 1312. The cam 1306 is substantially similar to the cam 410 described with reference to FIG. 4 and is substantially cylindrical in shape. The cam axle 1308 comprises a substantially thin, elongated shaft that is sized to be inserted through an offset longitudinal bore (not shown) in the cam 1306. In one embodiment, the cam axle 1308 is a single shaft having first and second opposing ends that protrude from first and second ends of the cam 1306; in another embodiment, the cam axle 1308 comprises two short shafts that protrude individually from respective ends of the cam 1306. A first end 1314 of the cam axle 1308 supports thereon the biasing member 1310 and the lever 1312. The biasing member 1310 and the lever 1312 are coupled to the cam axle 1308 such that rotation of the lever 1312 will translate into rotation of the cam axle 1308. A second end 1316 of the cam axle 1308 is adapted to support a spacer 1318.

Figure 14:
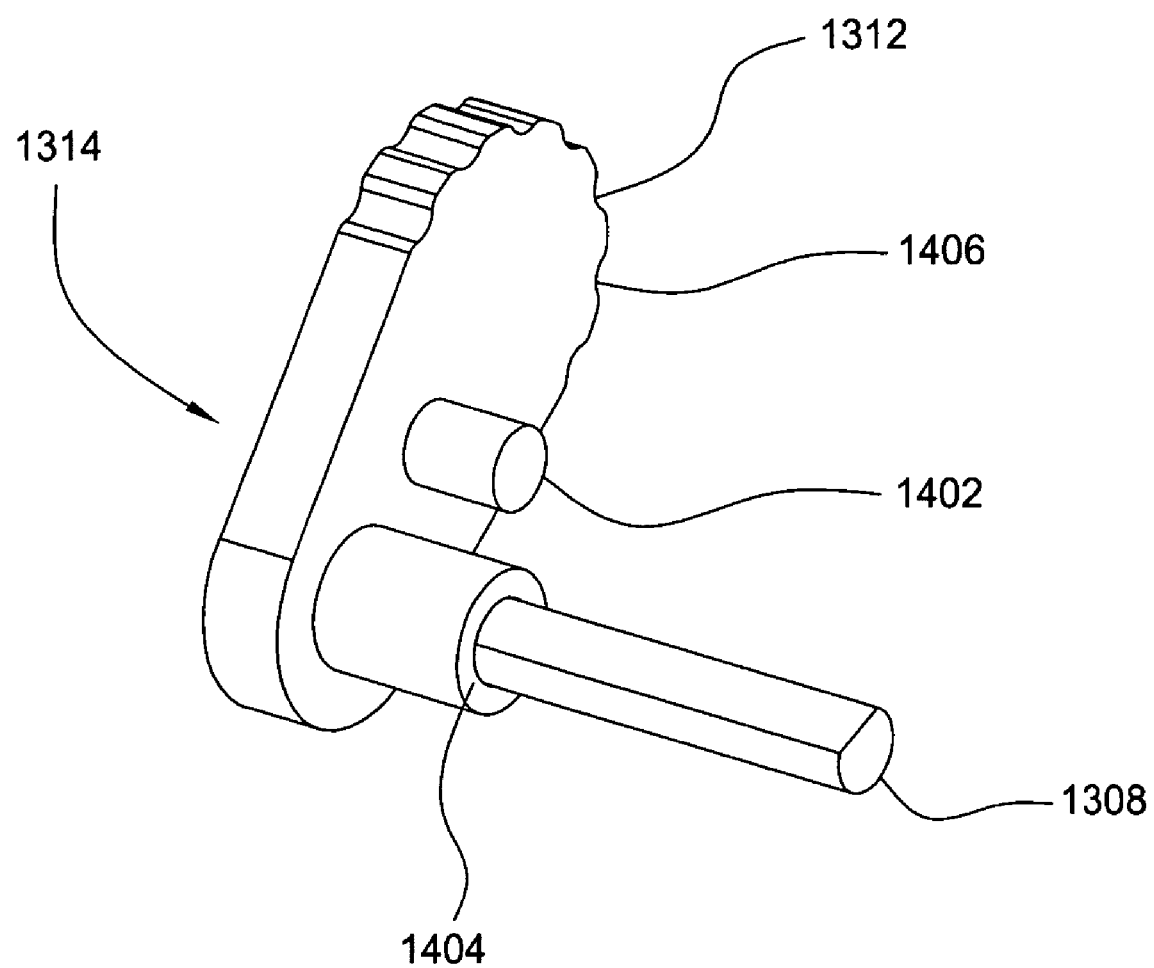
FIG. 14 depicts one embodiment of a lever for use with the belt cinch illustrated in FIG. 12.

FIG. 14 illustrates one embodiment of the first end 1314 of the cam axle 1308. As described with reference to FIG. 13, the first end 1314 of the cam axle 1308 is rigidly coupled to the lever 1312 in order to rotate the cam 1306. In addition, one embodiment of the lever 1314 further comprises a spring stop (e.g., a pin) 1402 and a spacer 1404. The spring stop 1402 is coupled to the lever 1314 and protrudes from an inward facing surface 1406 of the lever 1314, in an orientation substantially parallel to the cam axle 1308. The spacer 1404 is coupled between the body of the cam axle 1308 and the lever 1314. In one embodiment, the spacer 1404 is substantially cylindrical in shape and is free to slide along a portion of the cam axle 1308.

Figure 15:
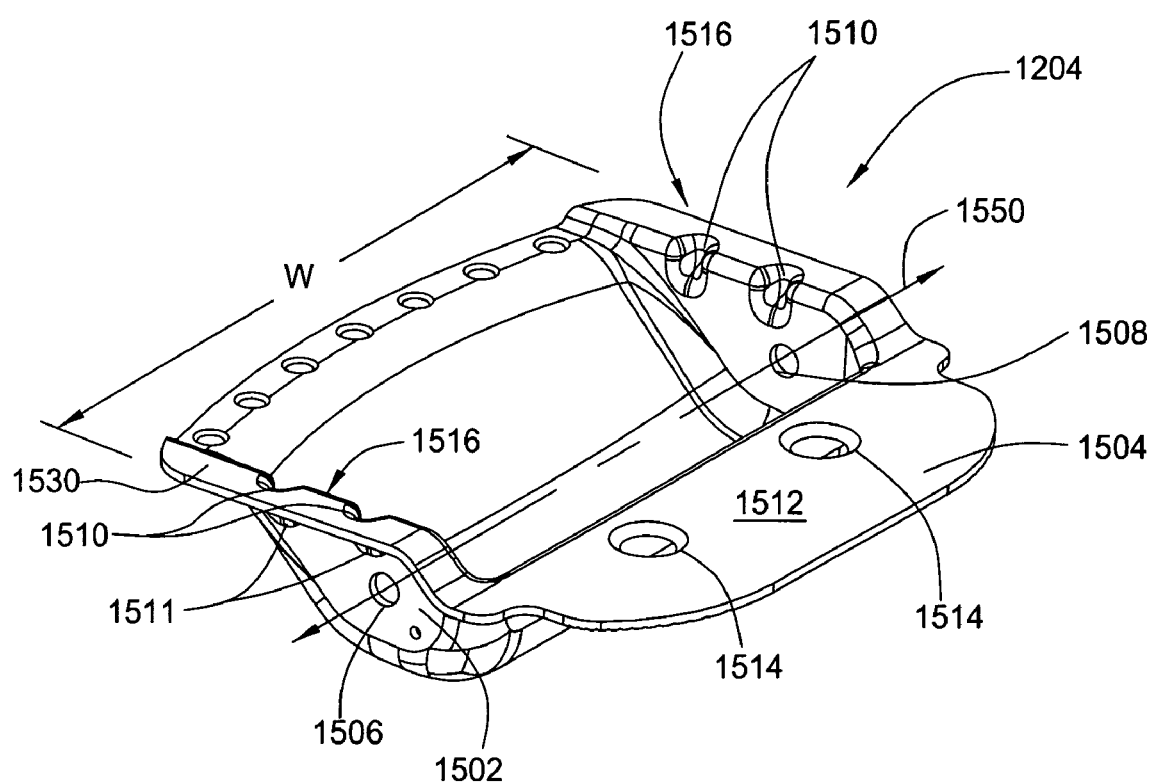
FIG. 15 depicts one embodiment of a cam housing for use with the belt cinch illustrated in FIG. 12.

FIG. 15 further illustrates the cam housing 1204. The cam housing 1204 is sized to house the cam assembly 1304 and comprises a trench 1502, a fastening plate 1504, at least first and second through holes 1506 and 1508, a plurality of notches 1510 and a lip 1530. In one embodiment, the width w of the cam housing 1204 is slightly larger than the length of the cam assembly 1204. The trench 1502 spans substantially the entire width w of the cam housing 1204 and is deep enough to accommodate most of the diameter of the cam 1306. The first and second through holes 1506 and 1508 are positioned at opposite longitudinal ends of the trench 1502 and are collinear along an axis 1550. The through holes 1506 and 1508 are adapted to support the cam axle 1308 therebetween, so that the first end 1314 of the cam axle 1308 passes through the first through hole 1506 to the exterior of the cam housing 1204 and the second end 1316 of the cam axle 1308 passes through the second through hole 1508 to the exterior of the cam housing 1204. The lever 1312 prevents the first end 1314 of the cam axle from disengaging from the first through hole 1506.

The fastening plate 1504 extends outwardly from the trench 1502, and is substantially parallel to the axis 1550. The fastening plate 1504 comprises a substantially flat plate 1512 having at least one through hole 1514 formed therein. The at least one through hole 1514 is sized to receive a fastener (1322 in FIG. 3) therethrough, in order to secure the clamp plate 1302 to the fastening plate 1504 of the cam housing 1204. The clamp plate 1302 and fastening plate 1504 are adapted to secure a tongue assembly of a safety belt system therebetween when engaged by the fastener(s) 1322. The lip 1530 extends from one end of the fastening plate 1504 and around the perimeter of the open edge 1516 of the trench 1502 to the other end of the fastening plate 1504. The lip 1530 extends slightly outward from the interior volume of the trench 1502.

The plurality of notches 1510 are formed on both longitudinal ends of the trench 1502, along an inwardly facing edge of the lip 1530 (i.e., above the through holes 1506 and 1508). In one embodiment, two notches 1510 are formed on either longitudinal end of the trench 1502. The notches 1510 on each end of the trench 1502 directly face each other, so that the notches 1510 on either end of the trench 1502 are collinear along axes that are substantially parallel to the axis 1550. The notches 1510 create small corresponding bumps 1511 on the outer surface of the cam housing 1204.

Figure 16A:
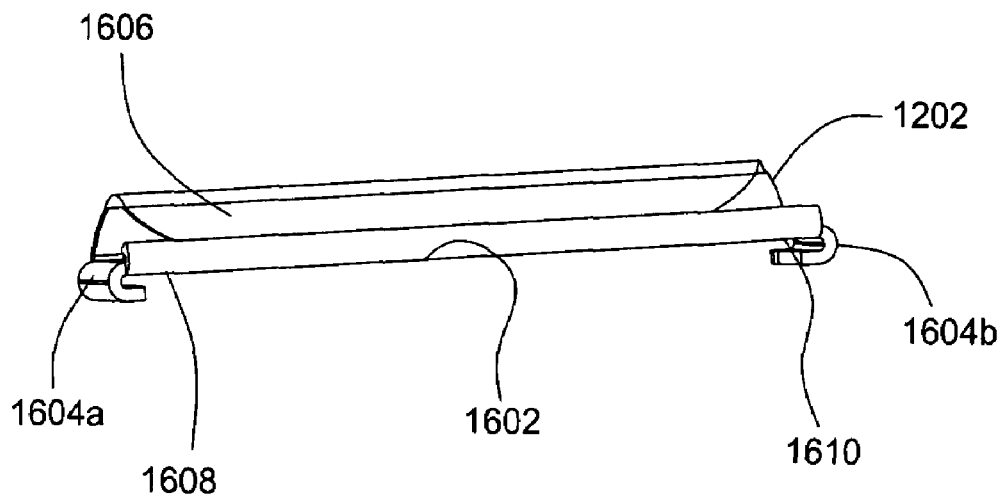
FIG. 16A depicts a plan view of one embodiment of a slider plate for use with the belt cinch illustrated in FIG. 12.
Figure 16B:
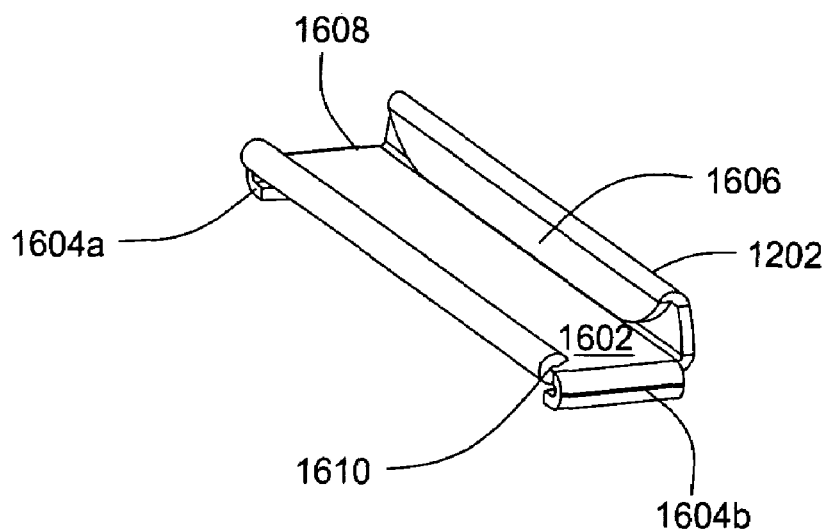
FIG. 16B depicts an isometric view of the slider plate illustrated in FIG. 16A.

FIGS. 16A and 16B illustrate, respectively, plan and isometric views of one embodiment of a slider 1202. As discussed with reference to FIG. 12, the slider 1202 is adapted to slide over at least a portion of the cam housing 1204. The slider 1202 comprises a slider plate 1602, at least two lock flanges 1604a and 1604b, and a slide flange 1606. The slider plate 1602 is substantially flat and rectangular in shape, and is formed of a substantially rigid material. In one embodiment, the slider plate 1602 is formed of steel, aluminum or hard plastic. The length of the slider plate 1602, from a first end 1608 to a second end 1610, is slightly longer than the length of the trench 1502, including the length to which the lip 1530 extends from either end of the trench 1502.

Figure 16C:
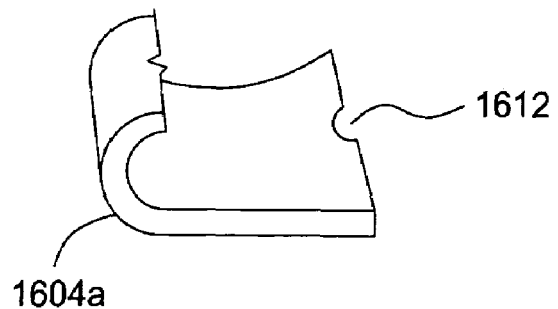
FIG. 16C illustrates a side view of the lock flange incorporated into the slider plate illustrated in FIGS. 16A and 16B.

The lock flanges 1604a and 1604b are coupled, respectively, to the first and second ends 1608 and 1610 of the slider plate 1602. The lock flanges 1604a and 1604b extend downwardly from the ends 1608 and 1610 of the slider plate 1602, and in one embodiment, the lock flanges 1604a and 1604b have a curved shape that curves inwardly along the length of the slider plate 1602 (i.e., toward a center of the slider plate 1602). In one embodiment, illustrated in FIG. 16C, the lock flanges 1604a and 1604b further comprises a small notch 1612 formed in the edge 1620 that extends inwardly along the length of the slider plate 1202. The slide flange 1606 extends upward from the slider plate 1602 in an orientation substantially normal to the slider plate 1602. In one embodiment, the length of the slide flange 1606 is approximately equal to the length of the slider plate 1602. The slide flange 1606 extends upward from the slider plate 1602 a distance sufficient to allow a user to engage the slide flange 1606 to manipulate the slider 1202.

FIG. 17 illustrates one embodiment of a clamp plate 1302. The clamp plate 1302 includes clamp section 1702 and a fastening section 1704. The clamp section 1702 is a substantially flat surface adapted for clamping a portion of a safety belt tongue assembly. In one embodiment, the surface of the clamp section 1702 is textured to enhance engagement with the tongue assembly. The fastening section 1704 includes a stepped portion (i.e., slightly thicker than the clamp section 1702) having at least one threaded hole 1706 formed therethrough. The through hole 1706 is sized to receive the fastener 1322 illustrated in FIG. 13.

When the belt cinch 1200 is assembled, the cam axle 1308 is inserted through the bore in the cam 1306, and the ends 1314 and 1316 of the cam axle 1308 are disposed through the through holes 1506 and 1508 in the cam housing 1204, so that the cam 1306 is housed within the cam housing 1204 and a majority of the cam 1306 is disposed within the trench 1502. In one embodiment, a portion of the cam diameter protrudes above the trench 1502.

The slider plate 1202 is coupled to the cam housing 1204 so that the lock flanges 1604a and 1604b curl around and engage the lip 1530 of the cam housing 1204. This is accomplished by rotating the lever 1312 on the first end 1314 of the cam axle 1308. The biasing member 1310 supported on the first end 1314 of the cam axle 1308 biases the lever 1310 in a rotational direction away from the fastening plate 1504, so that the spring stop 1402 is biased against the lip 1530 of the cam housing 1204. When the lever 1310 is rotated in a direction toward the fastening plate 1504, the spring stop 1402 is rotated away from the lip 1530 to provide clearance for the lock flanges 1604a and 1604b of the slider plate 1202 to be slid onto the cam housing 1204. The bumps 1511 on the outer surface of the cam housing 1204 engage the notches 1612 on the lock flanges 1604a and 1604b, thereby securing the slider plate 1202 in a slidable engagement with a portion of the cam housing 1204 above the trench 1502.

Figure 18:
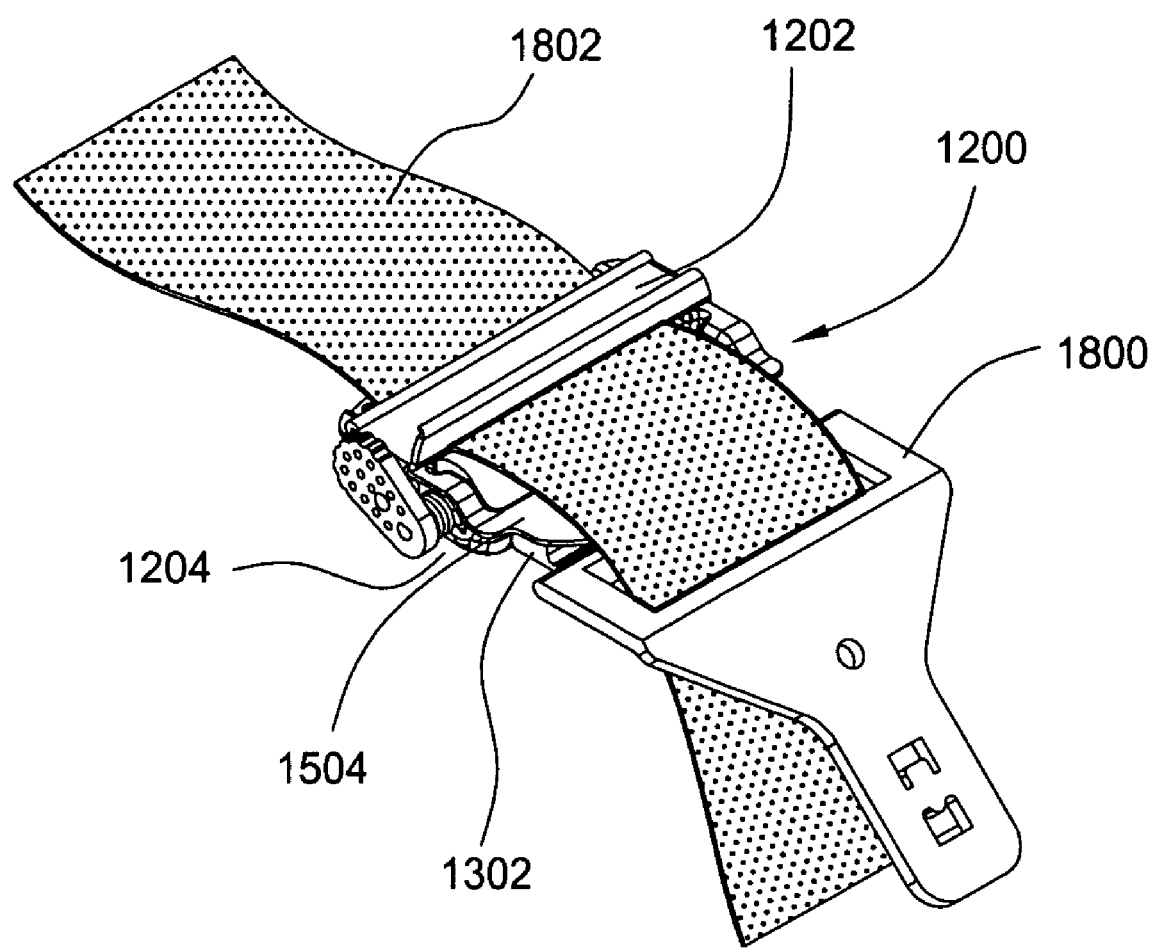
FIG. 18 depicts the belt cinch of FIG. 12 installed on a safety belt tongue assembly.

FIG. 18 illustrates the belt cinch 1200 in use with a tongue assembly 1800 of a safety belt system. In use, a portion of the tongue assembly 1800 is placed between the fastening plate 1504 of the cam housing 1204 and the clamp section (1702 in FIG. 17) of the clamp plate 1302 when the slider 1202 is in the "forward" or engaged position. When the slider 1202 is to the rear or dismounted completely, the webbing 1802 is no longer between the cam and the slider 1202 and the belt cinch 1200 is disengaged. Fasteners 1322 disposed through the threaded holes (1706 in FIG. 17 and 1514 in FIG. 15) secure the tongue assembly 1800 between the cam housing 1204 and the clamp plate 1302. The belt webbing 1802 is then run over the fastening plate 1504, over the cam (e.g., cam 1306 of FIG. 13), and under the slider plate 1202. Thus, the belt webbing 1802 is disposed between the cam 1306 and the slider plate 1202.

FIGS. 19A and 19B illustrate the belt cinch 1200 in the "lock" and "release" positions, respectively. In one embodiment, to lock the belt webbing 1802 in place, the lever 1312 is rotated in a direction away from the fastening plate 1504, and the slider plate 1202 is slid manually (e.g., using the slide flange 1606) along the lip 1350 in the direction of the tongue assembly 1800 (and fastening plate 1504). The slider plate 1202 is slid toward the tongue assembly 1800 until the notches 1612 in the lock flanges 1604a and 1604b engage bumps 1511 on the cam housing 1204 that position the slider plate 1202 substantially directly above the cam 1306. The relative orientation of the slider plate 1202 and cam 1306 locks the belt webbing 1802 tightly in place between the cam 1306 and the slider plate 1202, thereby preventing the webbing 1802 from loosening.

To release the belt cinch 1200, in one embodiment, the lever 1312 is rotated in a direction toward the fastening plate 1504, so that the cam 1306 is rotated to a position where the belt webbing 1802 is no longer held tightly between the cam 1306 and the slider plate 1202. The slider plate 1202 may then be slid in a direction away from the fastening plate 1504, thereby allowing the belt webbing 1802 to pass freely between the cam 1306 and the slider plate 1202.

Figure 20:
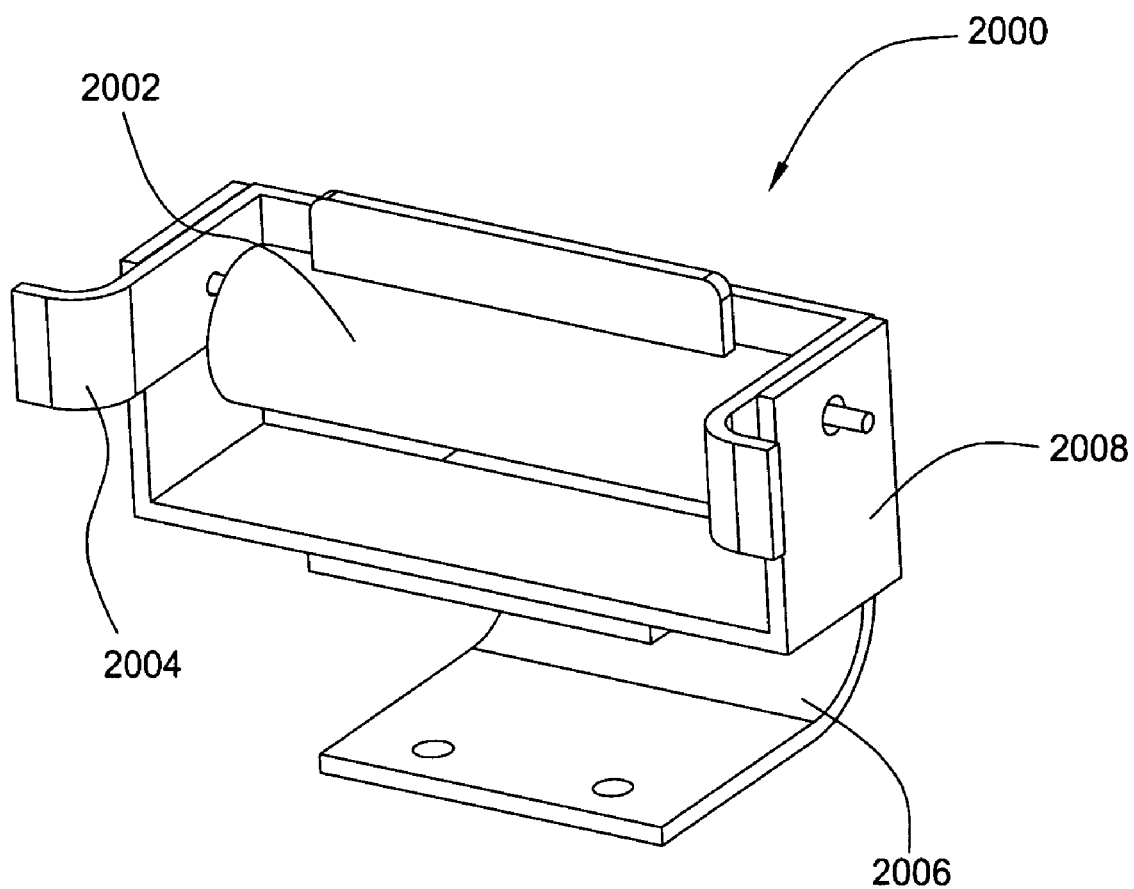
FIG. 20 depicts another embodiment of a belt cinch according to the present invention.
Figure 21:
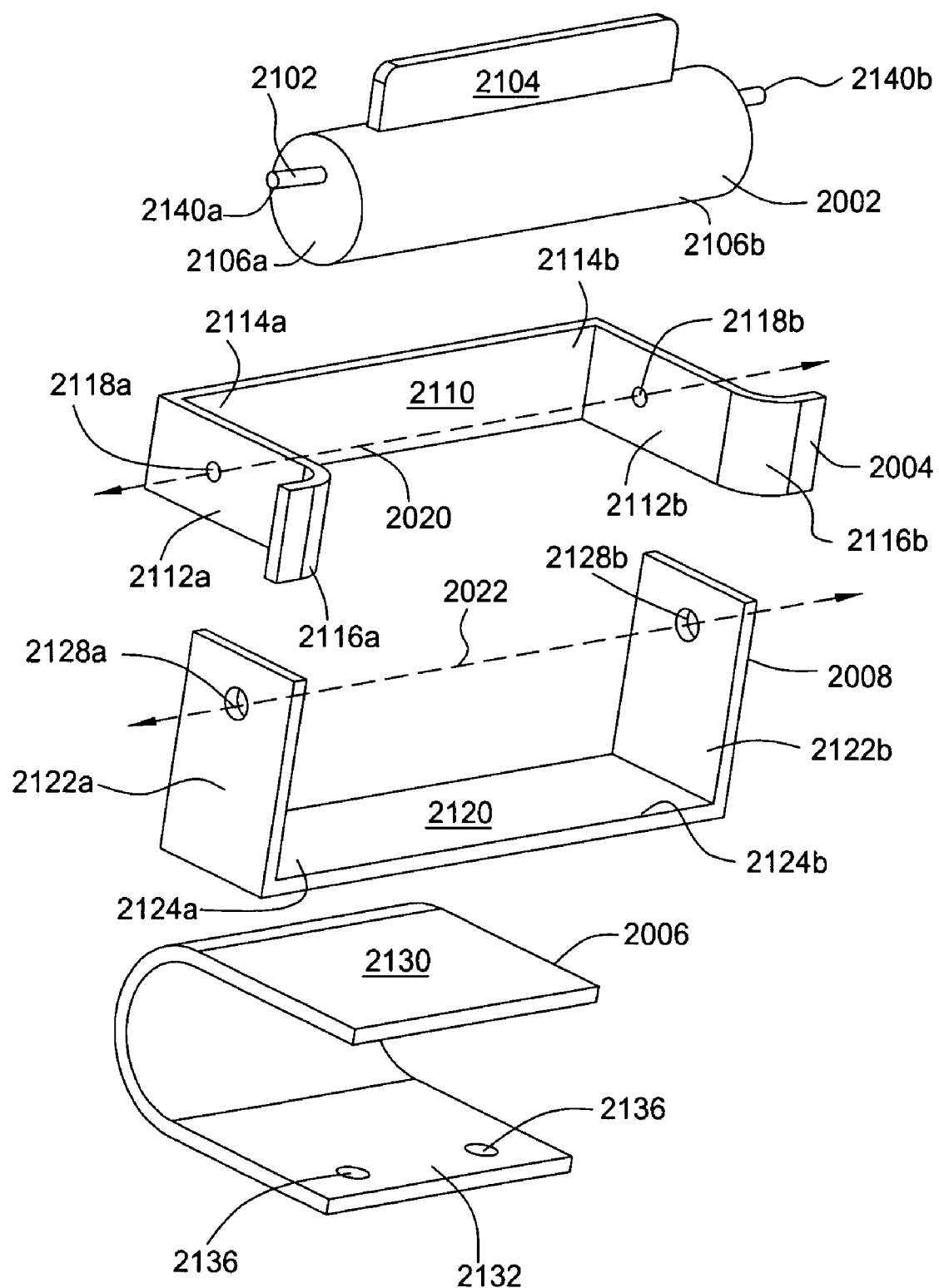
FIG. 21 depicts an exploded view of the belt cinch illustrated in FIG. 20.

FIG. 20 illustrates another embodiment of a belt cinch 2000 according to the present invention. The belt cinch 2000 includes a cam 2002, a cam carrier 2004, a main body 2008, and a fastening plate 2006. The cam 2002, cam carrier 2004, main body 2008, and fastening plate 2006 are illustrated in an exploded view in FIG. 21.

The cam 2002 is substantially similar to the cams described with reference to the preceding figures, and includes a bore (not shown), an axle 2102 and a lever 2104. The bore is disposed longitudinally through the body of the cam 2002 and is set off-center. In one embodiment, the axle 2102 comprises a long, thin shaft disposed through the bore in the cam 2002 and projecting from first and second ends 2106a and 2106b of the cam 2002. Alternatively, the axle 2102 may comprise two short shafts projecting, respectively, from the ends 2106a and 2106b of the cam 2002. The lever 2104 comprises a flange that extends along at least a portion of the longitudinal length of the cam 2002, and is orientated substantially normal to the body of the cam 2002.

The cam carrier 2004 comprises a bracket shaped body including a base 2110 and first and second arms 2112a and 2112b. The base 2110 is substantially flat, and in one embodiment is substantially rectangular in shape. The length and width of the base 2110 are roughly equivalent to the length and diameter of the cam 2002. The arms 2112a and 2112b are respectively coupled to first and second ends 2114a and 2114b of the base 2110, and extend therefrom at an angle substantially normal to the base 2110. Each arm 2112a or 2112b includes a through hole 2118a or 2118b formed therethrough, and the through holes 2118a and 2118b are axially aligned along an axis 2020 that is orientated substantially parallel to the base 2110. In one embodiment, each arm 2112a or 2112b also comprises a curved portion 2116a or 2116b. The curved portion 2116a or 2116b is positioned at an end of the arm 2112a or 2112b that is distal from the base 2110, and the curved portion 2116a or 2116b curves in an outward direction from the cam carrier 2004.

The main body 2008 comprises a bracket shaped body including a base 2120 and first and second arms 2122a and 2122b. The base 2120 is substantially flat, and in one embodiment is substantially rectangular in shape. The length and width of the base 2110 are slightly larger than the length and width of the cam carrier 2004. The arms 2122a and 2122b are respectively coupled to first and second ends 2124a and 2124b of the base 2120, and extend therefrom at an angle substantially normal to the base 2120. Each arm 2122a or 2122b includes a through hole 2128a or 2128b formed therethrough, and the through holes 2128a and 2128b are axially aligned along an axis 2022 that is orientated substantially parallel to the base 2120.

The fastening plate 2006 comprises a substantially U-shaped bracket having a first face 2130 and a second face 2132 orientated substantially parallel to the first face 2130. The second face 2132 includes at least one through hole 2136 sized to receive a fastener (not shown). In one embodiment, the fastener is a set screw.

To assemble the belt cinch 2000, the cam carrier 2004 is positioned within the main body 2008, so that the through holes 2118a and 2118b in the arms 2112a and 2112b of the cam carrier 2004 are aligned with the through holes 2128a and 2128b in the arms 2122a and 2122b of the main body 2008. The axle 2102, which is inserted into the longitudinal bore in the cam 2002, is supported by the cam carrier 2004 and main body 2008, so that a first end 2140a of the axle 2102 protrudes through the through holes 2118a and 2128b, and a second end 2140b of the axle 2102 protrudes through the through holes 2118b and 2128b. The fastening plate 2006 is mounted to the underside of the base 2120 of the main body 2008 (e.g., opposite the cam 2002).

Figure 22:
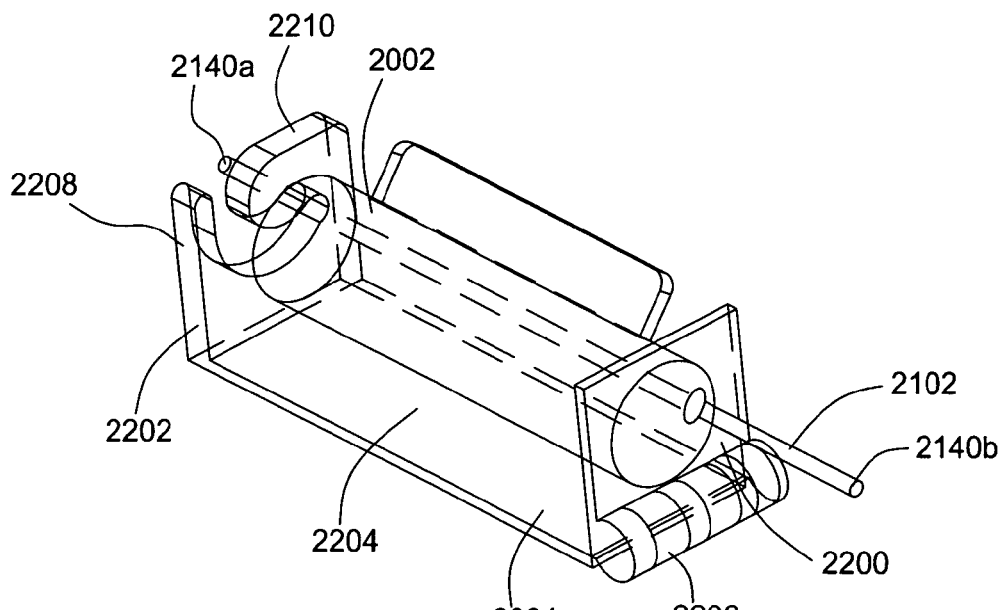
FIG. 22 depicts one embodiment of a hinged cam carrier assembly.

In another embodiment illustrated in FIG. 22, the cam carrier 2004 may include at least one hinged arm 2200. The arm 2200 is coupled to the base 2204 by a hinge 2206 that allows the arm 2200 to rotate about an axis substantially normal to the cam axle 2102, thereby enabling easy installation of the cam 2002 within the cam carrier 2004 (and easy insertion of a safety belt webbing between the cam 2002 and the carrier 2204). In one embodiment, one arm 2200 of the cam carrier 2204 is hinged, and the opposing arm 2208 includes a spiral slot 2210 (i.e., "the safety pin closure").

The spiral slot 2210 is open at one end and is sized to receive and retain the first end 2140a of the cam axle 2102.

Figure 23A:
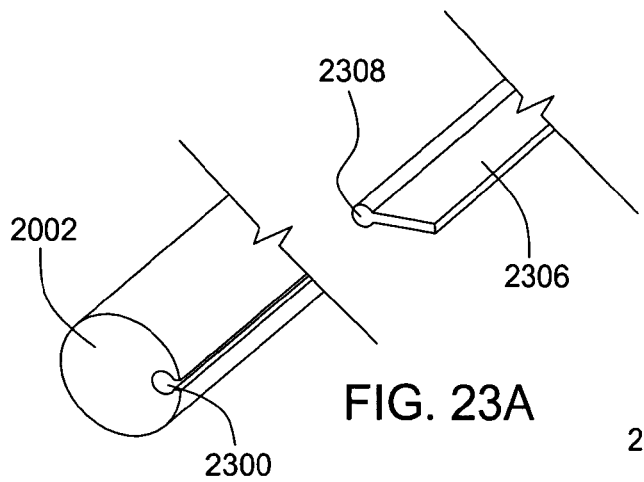
FIG. 23A depicts one embodiment of a slide lock for a cam for use with embodiments of the present invention.
Figure 23B:
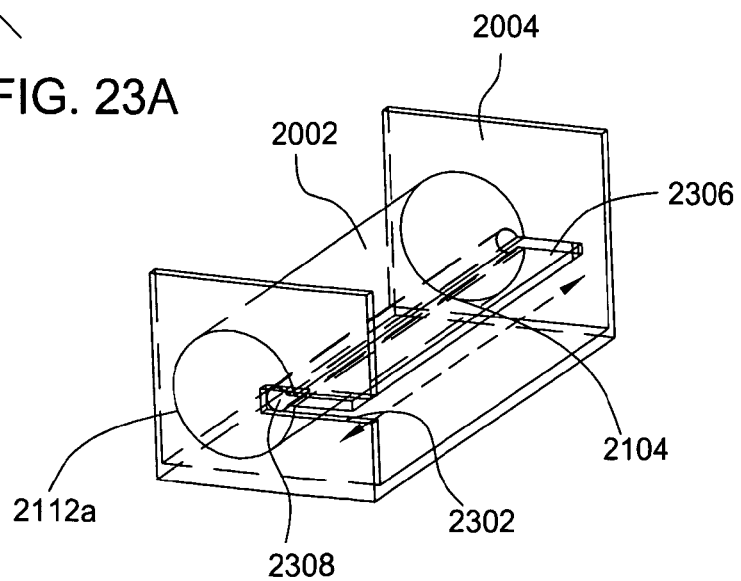
FIG. 23B depicts one embodiment of a cam and cam carrier adapted for use with the cam slide lock illustrated in FIG. 23A.

In another embodiment illustrated in FIGS. 23A and 23B, the lever 2104 is a removable slide catch. In the embodiment illustrated, the body of the cam 2002 includes a slot 2300, and one arm of the cam carrier 2004 includes a slot 2302 that is aligned with the slot 2300 in the cam 2002 when the cam 2002 is mounted to the cam carrier 2004. The lever 2104 comprises a flange 2306 having a release tab 2308 coupled thereto. The release tab 2308 is shaped so that the lever 2104 may be slid through the slots 2302 and 2300 in the cam carrier 2004 and cam 2002 to engage the slot 2300 in the cam 2002. Engagement of the lever's release tab 2308 with the cam's slot 2300 couples the lever 2104 to the cam 2002 to allow for manual rotation of the cam 2002 about its axle (not shown). In one embodiment, the cam 2002 is only rotatable when engaged by the lever 2104 in the manner described, so that if the lever 2104 is disengaged from the cam 2002 (i.e., by sliding the release tab 2308 out of the slot 2300), the cam 2002 will lock in position.

Figure 24:
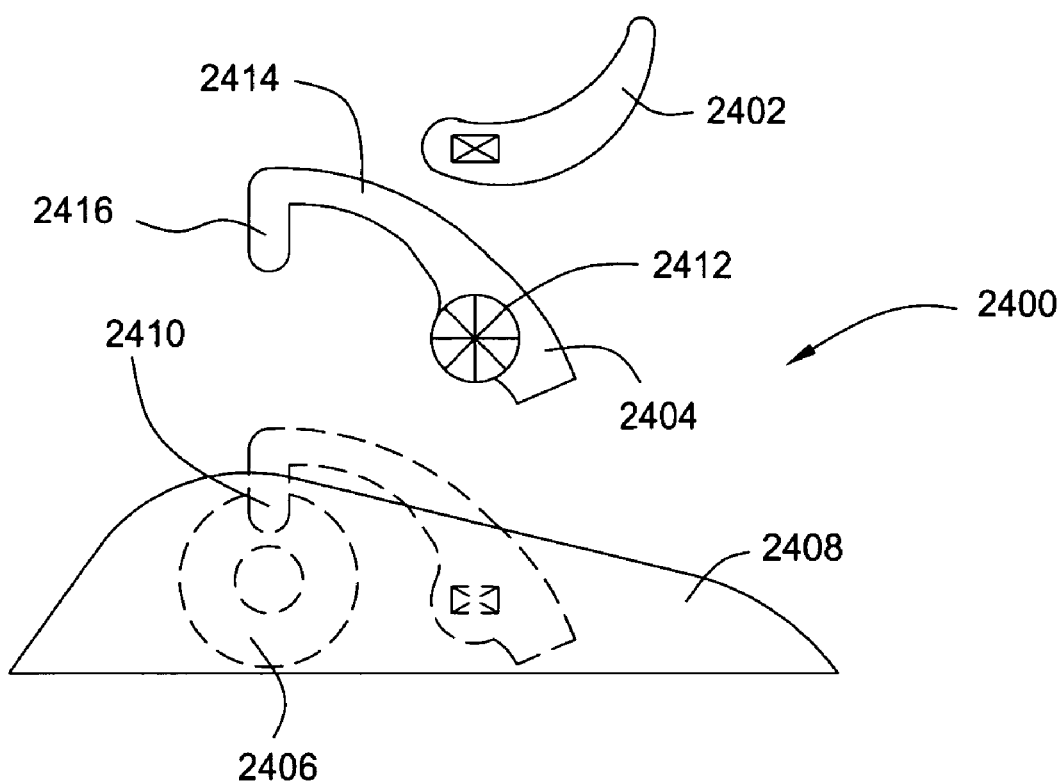
FIG. 24 depicts one embodiment of an "on/off" mechanism for use with a belt cinch according to the present invention.

In one embodiment, any of the belt cinch systems described herein may further incorporate a switch 2400 for selectively enabling or disabling the belt cinch device. In one embodiment, illustrated in exploded view in FIG. 24, the switch 2400 comprises a lever 2402, a pawl 2404, and a notched cam 2406. The cam 2406 is substantially similar to the cams described previously herein and comprises a substantially cylindrical body that includes a notch 2410 formed in a portion thereof. In one embodiment, the notch 2410 runs the entire length of the cam body; in another embodiment, the notch 2410 is a small indentation formed only in one end of the cam 2406. In one embodiment, the pawl 2404 comprises a pivot 2412, an arm 2414, and a hook 2416. The pivot 2412 is adapted to be rotatably mounted to an interior side of the cam housing, for example on a short axle (not shown). The arm 2414 extends from the pivot, and the hook 2416 is coupled to a distal end thereof. The hook 2416 is sized to engage the notch 2410 in the cam 2406. The lever 2402 is coupled on a common axis (e.g., on a common axle) with the pawl 2404, such that rotation of the lever 2402 will induce rotation of the pawl 2404. In further embodiment, means for rotation the pawl 2404 may include a slidable button, a linear actuator, or the like.

Figure 25A:
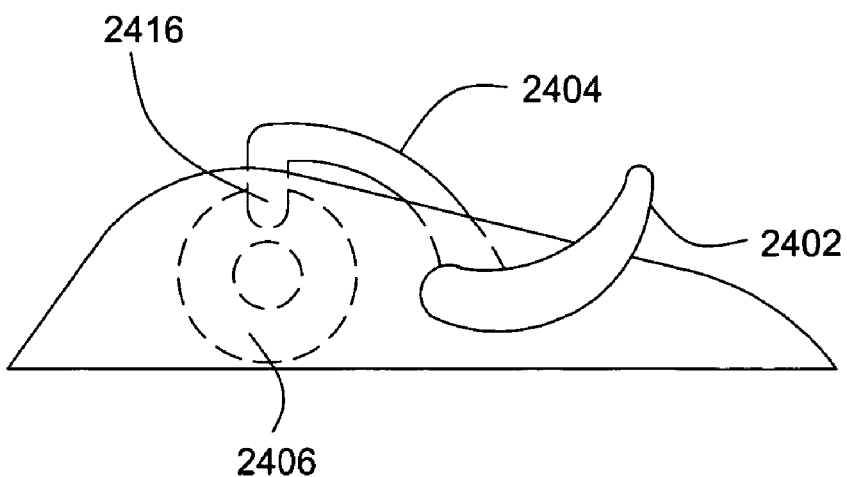
FIG. 25A depicts the on/off mechanism of FIG. 24 in an engaged position.
Figure 25B:
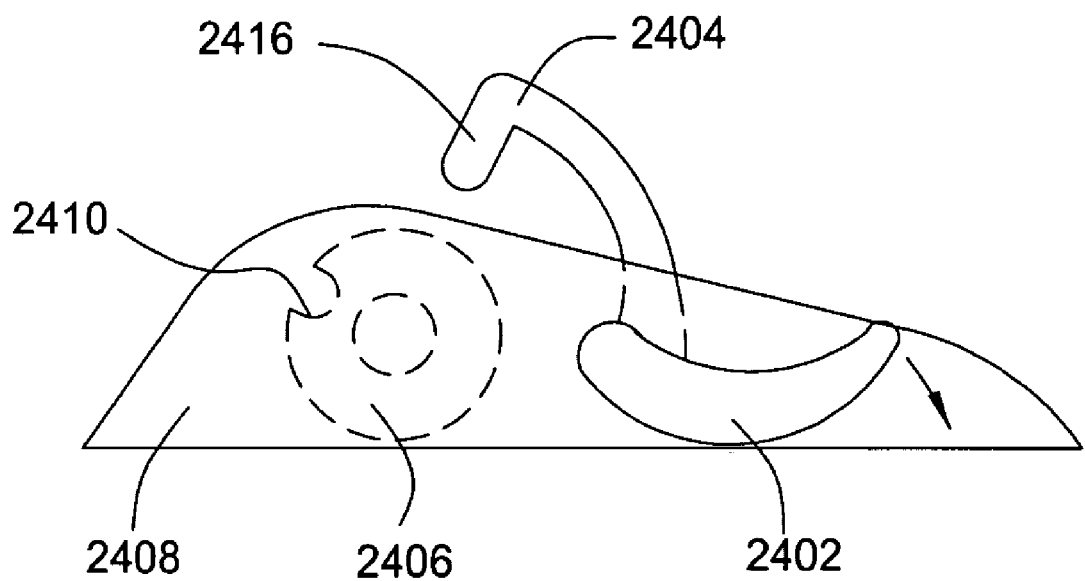
FIG. 25B depicts the "on/off" mechanism of FIG. 24 in an unengaged position.

FIGS. 25A and 25B illustrate the switch 2400 in "enabled" and "disabled" positions, respectively. When the switch 2400 is enabled (i.e., when the belt cinch is engaged), the hook 2416 of the pawl 2404 is positioned to engage the notch 2410 in the cam 2406, thereby locking the cam 2406 in place to secure a portion of seat belt webbing (not shown). As illustrated in FIG. 25B, to disable the switch 2400 (i.e., to disengage the belt cinch), the lever 2402 is rotated in a direction away from the cam 2406. Rotation of the lever 2402 induces rotation of the pawl 2404 as discussed above, so that the hook 2416 of the pawl 2404 disengages from the notch 2410 in the cam 2406. Disengagement of the hook 2416 and the notch 2410 allows the cam 2406 to freely rotate as illustrated in FIG. 25B, thereby allowing the belt webbing (not shown) to freely pass between the cam 2406 and the cam housing 2408.

In one embodiment illustrated in FIG. 26, a cam housing 2600 has a wrap-around structure. In the embodiment illustrated, a mounting portion 2610 of the cam housing 2600 includes a slot 2606 formed between two tabs 2604. In another embodiment, as illustrated in FIG. 27, the tabs 2704 could be adapted to wrap behind the mounting portion 2610.

In another embodiment illustrated in FIG. 28, a door 2802 is coupled to one end 2804 of the cam housing 2800. The door 2802 is adapted to be opened so that a portion of seat belt webbing (not shown) may be easily slid into the cam housing 2800. In one embodiment, the door 2802 is hinged, screwed, snapped or clipped into place to allow the door 2802 to open and close.

In an embodiment illustrated in FIG. 29, the cam housing 2900 includes a lower plate 2902. The lower plate 2902 defines an opening 2906 with the cam housing 2900 that is sized to received the buckle 2908 of the tongue assembly 2904.

Figure 30:
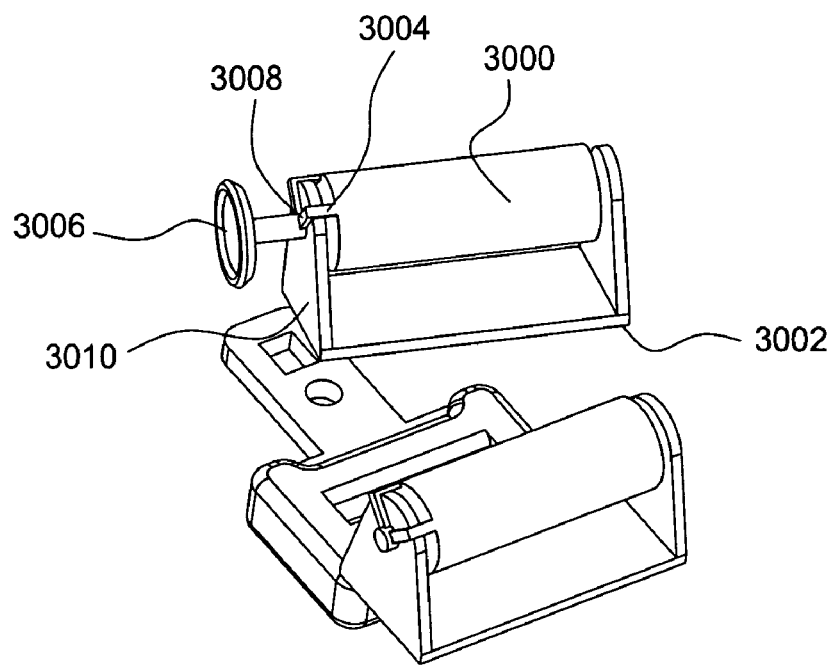
FIG. 30 depicts another embodiment of a cam and cam housing for use in a belt cinch, according the present invention.

In an embodiment illustrated in FIG. 30, one end 3004 of the cam 3000 is held within the cam carrier 3002 by a spring loaded pull pin 3006, or similar mechanism (such as a shoulder bolt, cotter pin or ring, among others). A spiral slot 3008 in one arm 3010 of the cam carrier 3002 allows an end of the cam 3000 to be removed from the cam carrier 3002, to allow the installation of belt webbing between the cam 3000 and the cam carrier 3002.

Figure 31:
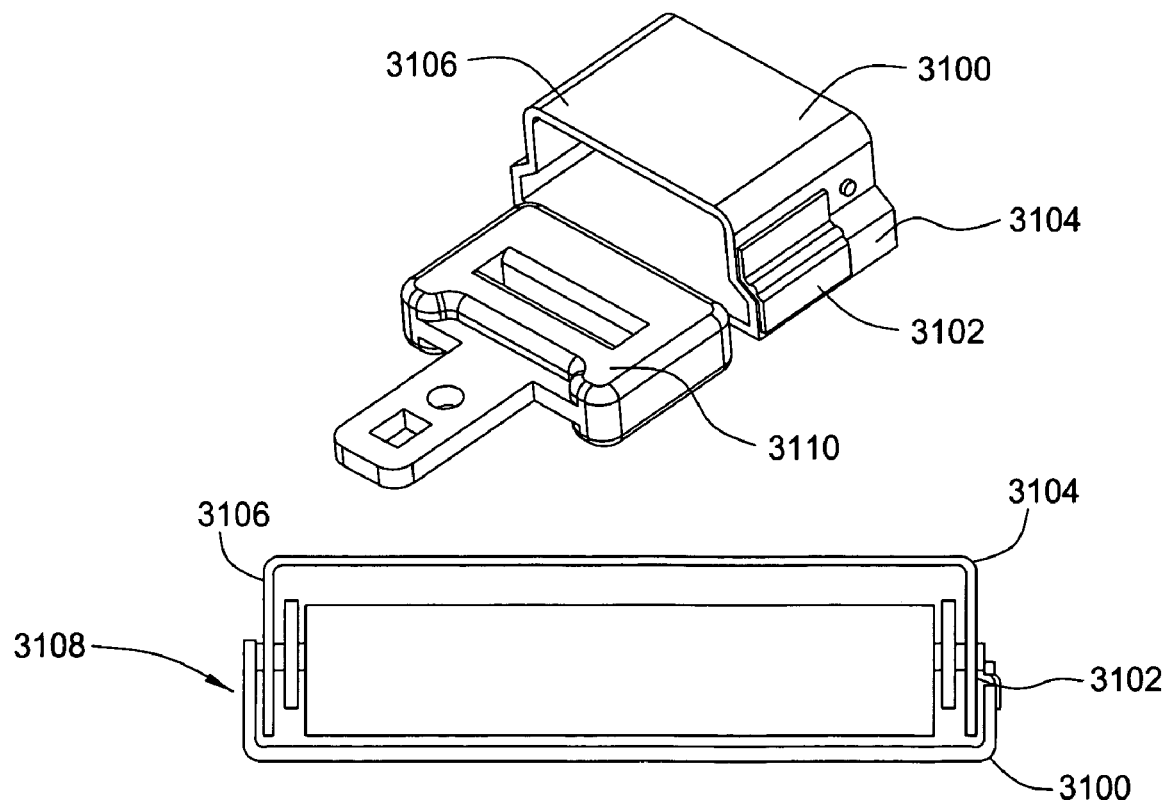
FIG. 31 depicts another embodiment of a cam and cam housing for use in a belt cinch, according the present invention.

In an embodiment illustrated in FIG. 31, the cam housing 3100 includes a hinge 3102 on one side 3104, and a locking mechanism (such as a snap, hook, screw, pin or the like) on an opposite side 3108, thereby enabling the cam housing 3100 to be opened or closed like a "clamshell".

Figure 32:
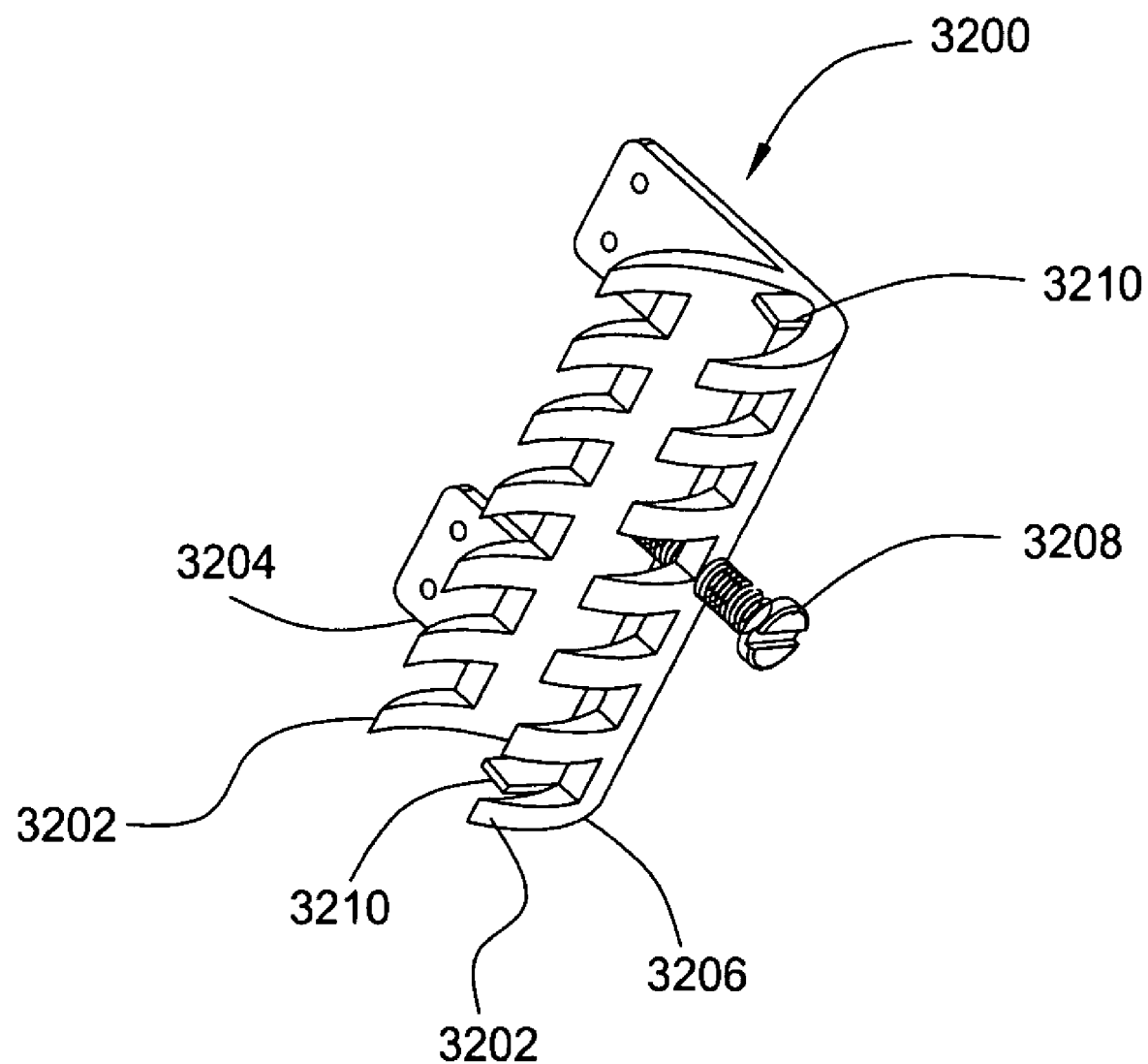
FIG. 32 depicts another embodiment of a cam and cam housing for use in a belt cinch, according the present invention.

In the embodiment illustrated in FIG. 32, the cam housing is mounted to the tongue assembly by a spring loaded clamp 3200. The spring loaded clamp 3200 comprises first and second opposing rows 3204 and 3206 of teeth 3202, the rows 3204 and 3206 being biased toward one another. The teeth 3202 are adapted to grip the tongue assembly. A surface of one of the rows 3204 or 3206 includes a through hole (not shown) that is adapted to receive a screw 3208 or similar device. The screw 3208 is adapted hold the rows 3204 and 3206 of teeth 3202 apart (i.e., tightening of the screw 3208 drives the length of the screw 3208 against an interior surface of the clamp 3200 and exerts a force on the interior surface of the clamp 3200 that pushes the rows 3204 and 3206 of teeth 3202 away from each other). The tongue assembly may be slid between the rows 3204 and 3206 of teeth 3202 once the screw 3208 has been tightened to hold the rows 3204 and 3206 apart a sufficient distance. Loosening of then causes the clamp 3200 to return to a relaxed position, so that the rows 3204 and 3206 of teeth 3202 move toward one another to grip the tongue assembly therebetween. In one embodiment, the clamp 3200 further includes two or more tabs 3210, one each positioned proximate to either end of the rows 3204 and 3206 of teeth 3202. The tabs 3210 are positioned to ensure that the tongue assembly is not inserted too far into the clamp 3200.

In one embodiment, any of the belt cinch systems described herein may be incorporated into a "passive" safety belt system. That is, the belt cinch may be incorporated into a safety belt system that will automatically engage the belt cinch, without any manual action on the part of the user to remove slack in the lap belt portion of the webbing (e.g., pulling/tightening of the belt webbing). In general, slack may be removed from the belt webbing by: (1) shortening the lap belt from the retractor end; (2) shortening the lap belt from the buckle end; or (3) shortening the lap belt from the shoulder belt end.

Figure 33:
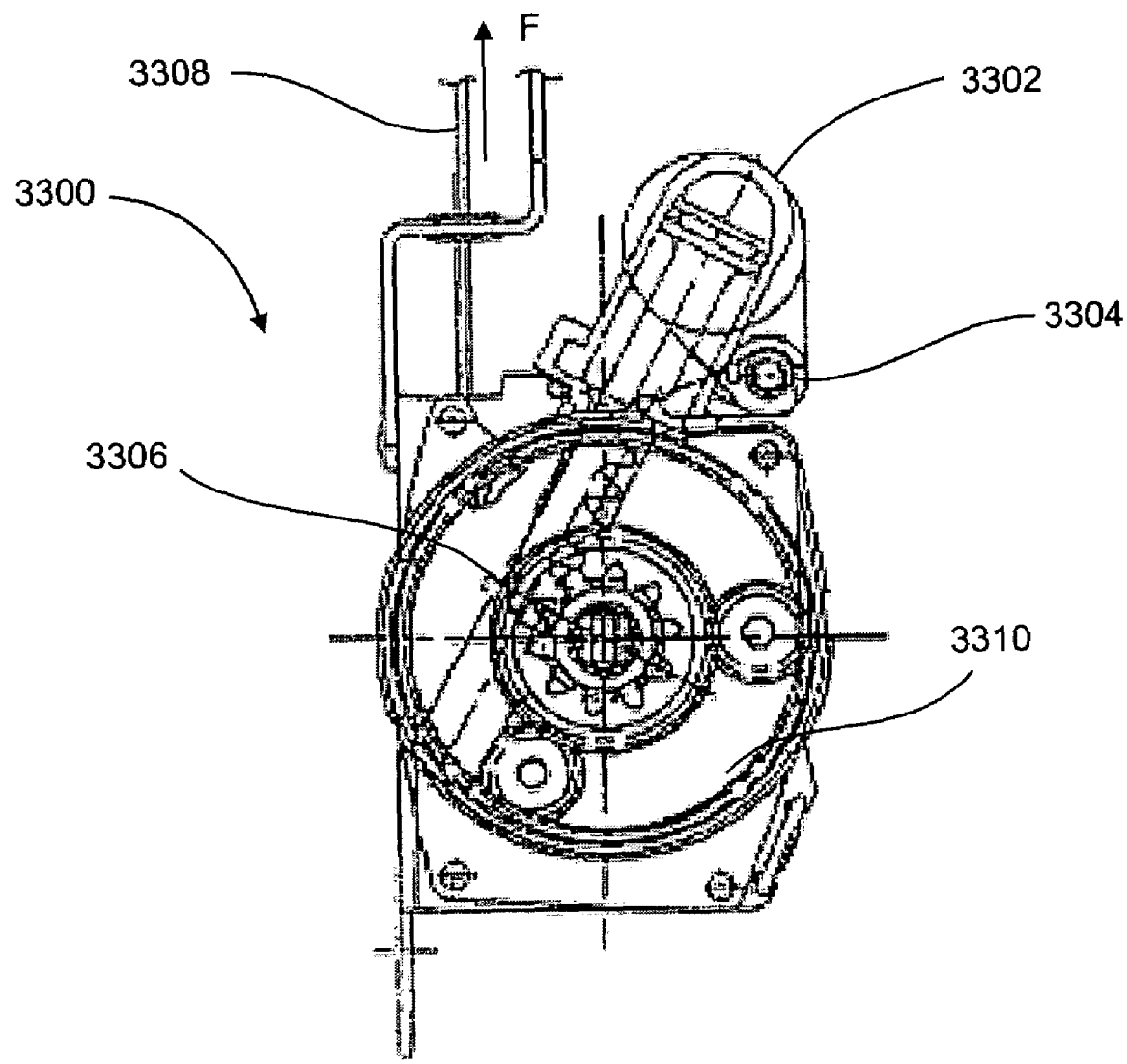
FIG. 33 depicts another embodiment of a retractor for incorporation in a passive safety belt system using a belt cinch according to the present invention.

In one embodiment of the present invention, illustrated in FIG. 33, a passive safety belt system incorporating a belt cinch includes a pre-tensioning retractor 3300 with an electric rewind motor 3302. The retractor 3300 further includes a force sensor 3304, one or more inertial lock components 3306, and a spool 3310. The spool 3310 is coupled to the retractor 3300 and is substantially cylindrical in shape. The spool 3310 is adapted to stored unused lengths of the shoulder portion 3308 of the seat belt webbing. The sensor 3304 is coupled to the rewind motor 3302, and in one embodiment is adapted to detect force or load applied to the shoulder portion 3308 of the belt webbing. In another embodiment, the sensor 3304 is calibrated to detect the amount of force being applied by the rewind motor 3302 to rewind the shoulder portion 3308 of the webbing. In one embodiment, the sensor is a strain gage or amp meter. The inertial lock components 3306 are coupled to the spool 3310 and are adapted, when engaged, to prevent the retractor 3300 from rewinding the belt webbing 3308.

In operation, a safety belt system user engages the passive safety belt system by buckling the tongue into the buckle of the system. A suitable switch or device in the seat belt buckle detects when the tongue is properly engaged in the buckle (the occupant has "buckled up"). The electric rewind motor 3302, urges the spool 3310 to rotate to rewind the shoulder portion 3308 of the belt webbing. This action effectively simulates the user pulling on the shoulder portion 3308 of the belt webbing to remove slack from the lap portion, and, in fact, removes said slack. The Force F imparted to the shoulder belt by the motor is detected by sensor 3304. Once slack has been effectively removed from the lap portion of the belt webbing, the sensor 3304 detects that sufficient force has been applied, and the electric rewind motor 3302 is disengaged, leaving the shoulder portion 3308 of the webbing in its original (i.e., "un-tensioned") condition.

In further embodiments, the electric rewind motor 3302 may be incorporated into other elements of the safety belt system, where the rewind motor 3302 is positioned to remove slack from the lap portion of the belt webbing. Furthermore, other means of belt webbing actuators, such as a linear actuator, a cam tightener, a pulley system, or the like, may be used in place of an electric motor. Further, the force applied may be made user-adjustable through an appropriate dial or adjustment such as a rheostat.

Thus, the present invention represents a significant advancement in the field of vehicle safety belt system design. In one embodiment, an apparatus is provided that may either be manufactured as a part of an OEM safety belt assembly, or may be adapted for retrofit to an existing, previously installed safety belt system. The apparatus substantially prevents unwanted loosening of an engaged safety belt system, thereby restraining a user and enhancing seat belt functionality, by improving occupant safety and comfort, child seat retention, and driver control.

Advantageously, the belt cinch and related apparatus described above are capable of being assembled around an existing seat belt webbing. In this manner the invention is also well suited for aftermarket (i.e., vehicle retrofit/add-on) applications using an existing factory-installed 3-point seat belt. This is beneficial because it is not safe or practical to cut or detach either end of an existing seat belt in order to place the webbing between the cam and the "entrapping" component (body or slider). Thus, the above-described invention has broad applicability to both original equipment manufacturer (OEM) and aftermarket applications.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. An apparatus comprising:
   a cam assembly at least partially rotatable with at least one
      axle, wherein said at least one cam axle further comprises a lever coupled to an end of said at least one axle, said lever being adapted to rotate said cam assembly with said at least one axle, and where said cam assembly comprises:
a cam having a substantially cylindrical body, a first end and a second end; and
a longitudinal bore disposed through said cam and positioned off-center relative to said substantially cylindrical body, said bore being adapted to receive said at least one axle; and
a cam housing adapted to at least partially house said cam assembly,
wherein said cam assembly is adapted to retain at least a portion of a safety belt webbing against a surface of said cam, thereby preventing passage of the safety belt webbing therebetween.

2. The apparatus of claim 1, wherein said at least one axle comprises:
a first axle engaging said first end of said cam; and
a second axle engaging said second end of said cam, said first and second axles being collinear along an axis disposed longitudinally through said cam.

3. The apparatus of claim 1, wherein said cam housing comprises:
a trench having a first end and a second end, said trench being adapted for retaining said cam assembly therein;
a fastening plate coupled to a longitudinal side of said trench; and
a lip extending outward from said trench, said lip extending from said fastening plate and around a perimeter of said trench.

4. The apparatus of claim 3, further comprising:
at least a first notch formed in an interior surface of said lip, proximate to said first end of said trench; and
at least a second notch formed in an interior surface of said lip, proximate to said second end of said trench, said second notch being located directly across said trench from said first notch,
wherein said first and second notches create first and second bumps on an outer surface of said trench.

5. The apparatus of claim 4, wherein said surface of said cam housing against which said cam assembly retains said safety belt webbing comprises:
a slider plate having a first end and a second end;
a first lock flange coupled to said first end of said slider plate; and
a second lock flange coupled to said second end of said slider plate,
said first and second lock flanges being adapted to slidably engage said lip of said trench, thereby allowing said slider plate to slide along said lip.

6. The apparatus of claim 5, wherein each of said first and second lock flanges comprises:
a notch formed in a free end of said lock flange, said free end being adapted to curve inwardly toward said trench.

7. The apparatus of claim 6, wherein said notch in said first and second lock flanges is adapted to engage said first and second bumps in said outer surface of said trench, thereby limiting movement of said slider plate along said lip.

8. The apparatus of claim 5, wherein said lever is rotationally biased toward said slider plate.

9. The apparatus of claim 8, wherein rotation of said lever in a direction away from said slider plate creates a clearance that allows that slider plate to slide freely along said lip.

10. The apparatus of claim 5, wherein said slider plate further comprises:
a slide flange coupled to said slider plate, said slide flange extending from at least a portion of said slider plate at an angle substantially normal to said slider plate.

11. The apparatus of claim 3, further comprising:
a clamp plate coupled to said fastening plate, said clamp plate and said fastening plate being adapted to retain a portion of a tongue assembly therebetween.

12. The apparatus of claim 1, wherein said safety belt webbing is at least partially coupled to a safety belt retractor that is adapted for removing slack in at least a portion of said safety belt webbing.

13. The apparatus of claim 12, wherein said safety belt retractor comprises:
a sensor adapted for sensing a force exerted on at least a portion of said safety belt webbing;
a spool adapted for stowing said safety belt webbing; and
an actuator adapted for rotating said spool to adjust said safety belt webbing in response to a force sensed by said sensor.

14. The apparatus of claim 13, wherein said sensor is at least one of a strain gage or amp meter.

15. The apparatus of claim 14, wherein said actuator is at least one of an electric rewind motor, a linear actuator, a cam tightener or a pulley system.

16. A method for restraining the movement of a safety belt system user, said method comprising the steps of:
locking at least a portion of a safety belt webbing between a rotatable cam and a cam housing, thereby preventing passage of the safety belt webbing therebetween, wherein said rotatable cam comprises:
a substantially cylindrical body having a first end and a second end;
a longitudinal bore disposed through said rotatable cam and positioned off-center relative to said substantially cylindrical body;
at least one axle disposed through at least a portion of said bore so that a first portion of said at least one axle projects from said first end of said cam, and a second portion of said at least one axle projects from said second end of said cam; and
a lever coupled to an end of said at least one axle, said lever being adapted to rotate said cam with said at least one axle.

17. The method of claim 16, wherein rotation of said cam by said lever releases said safety belt webbing.

18. The method of claim 16, further comprising the step of:
mounting at least one of said cam or said cam housing to a tongue assembly of said safety belt system.

19. The method of claim 16, further comprising the step of:
removing slack in at least a portion of said safety belt webbing.

20. The method of claim 19, wherein the step of removing said slack further comprises the steps of:
detecting a force exerted along a portion of said safety belt webbing; and
engaging a mechanism to rewind a portion of said safety belt webbing in response to said detected force.

* * * * *